United States Patent [19]
Nakamura et al.

[11] Patent Number: 6,104,432
[45] Date of Patent: Aug. 15, 2000

[54] COMPACT IMAGE PICKUP LENS SYSTEM FOR A VIDEO CAMERA

[75] Inventors: Akira Nakamura, Tokyo; Shuichi Kikuchi, Kanagawa, both of Japan

[73] Assignee: Sony Corporation, Tokyo, Japan

[21] Appl. No.: 08/745,056

[22] Filed: Nov. 7, 1996

[30] Foreign Application Priority Data

Nov. 10, 1995 [JP] Japan .................................... 7-315799
Nov. 13, 1995 [JP] Japan .................................... 7-318570

[51] Int. Cl.$^7$ ........................... H04N 5/225; G02B 15/02
[52] U.S. Cl. ............................................ 348/360; 359/673
[58] Field of Search .................................... 348/360, 335, 348/358, 359; 359/672, 673, 674, 687, 774

[56] References Cited

U.S. PATENT DOCUMENTS

| | | | |
|---|---|---|---|
| 4,169,660 | 10/1979 | Nakamura | 359/680 |
| 4,431,273 | 2/1984 | Nakamura | 359/708 |
| 5,164,859 | 11/1992 | Ito | 359/692 |
| 5,530,594 | 6/1996 | Shibayama | 359/609 |
| 5,568,197 | 10/1996 | Hamano | 348/360 |

*Primary Examiner*—Andrew Faile
*Assistant Examiner*—Aung S. Moe
*Attorney, Agent, or Firm*—William S. Frommer; Alvin Sinderbrand

[57] ABSTRACT

A compact video camera has an image pickup lens system providing a zooming function and a wide angle field of view. The zooming function is performed by a zoom lens, while the wide angle view is achieved via a wide angle converter. The wide angle converter, located closer to the object than the zoom lens, comprises a negative lens, a positive lens, and a reflecting member located between the negative and positive lenses. With the use of the reflecting member, an optical axis of the image pickup lens system extending from the object side to the image side of the camera may be folded. The position at which the optical axis is folded is located closer to the object side than the image side.

20 Claims, 38 Drawing Sheets

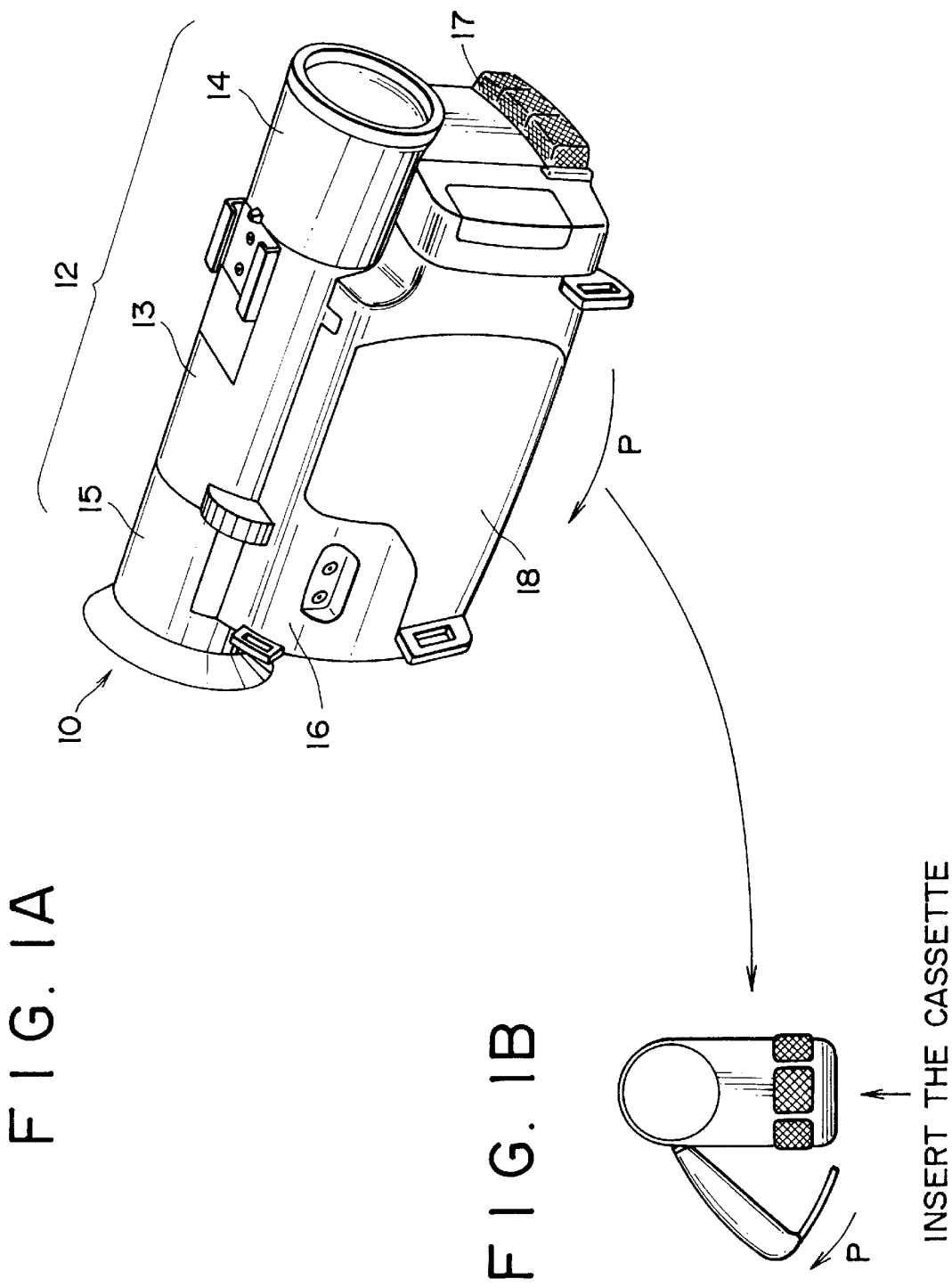

FIG. 2B

| SURFACE | $r_i$ | $d_i$ | $N_i$ | $v_i$ |
|---|---|---|---|---|
| 1 | 17.3764 | 0.2683 | 1.69680 | 55.46 |
| 2 | 7.4558 | 1.7153 | | |
| 3 | INFINITY | 2.6827 | 1.72342 | 37.99 |
| 4 | INFINITY | 2.5486 | 1.72342 | 37.99 |
| 5 | INFINITY | 0.1341 | | |
| 6 | 10.4139 | 0.2951 | 1.84666 | 23.78 |
| 7 | 5.1200 | 0.9215 | 1.62041 | 60.34 |
| 8 | -13.5482 | 0.0537 | | |
| 9 | 4.7603 | 0.5610 | 1.69680 | 55.46 |
| 10 | 20.8971 | VARIABLE | | |
| 11 | 21.8168 | 0.1341 | 1.83400 | 37.34 |
| 12 | 1.4974 | 0.5325 | | |
| 13 | -1.8539 | 0.1341 | 1.64850 | 53.03 |
| 14 | 2.1550 | 0.4302 | 1.84666 | 23.78 |
| 15 | -10.8157 | VARIABLE | | |
| 16 | STOP | 0.1878 | | |
| 17 | 2.1230 | 0.9268 | 1.58913 | 61.25 |
| 18 | 5.4746 | VARIABLE | | |
| 19 | 2.5614 | 0.2447 | 1.84666 | 23.78 |
| 20 | 1.4247 | 1.3885 | 1.58913 | 61.25 |
| 21 | -5.4608 | VARIABLE | | |
| 22 | INFINITY | 0.7276 | 1.51680 | 64.19 |
| 23 | INFINITY | 0.3000 | | |

FIG. 2C

| SURFACE | $A_4$ | $A_6$ | $A_8$ |
|---|---|---|---|
| 18 | 2.06777e-02 | 1.54480e-03 | 5.68096e-04 |
| 21 | 1.21351e-02 | -3.11493e-03 | 5.18183e-04 |

FIG. 2D

| f | 1.0000 | 2.4903 | 9.5727 |
|---|---|---|---|
| $d_{10}$ | 0.2426 | 2.1437 | 4.0448 |
| $d_{15}$ | 4.1913 | 2.2901 | 0.3890 |
| $d_{18}$ | 1.7651 | 1.0528 | 1.9438 |
| $d_{21}$ | 1.9563 | 2.6677 | 1.7877 |

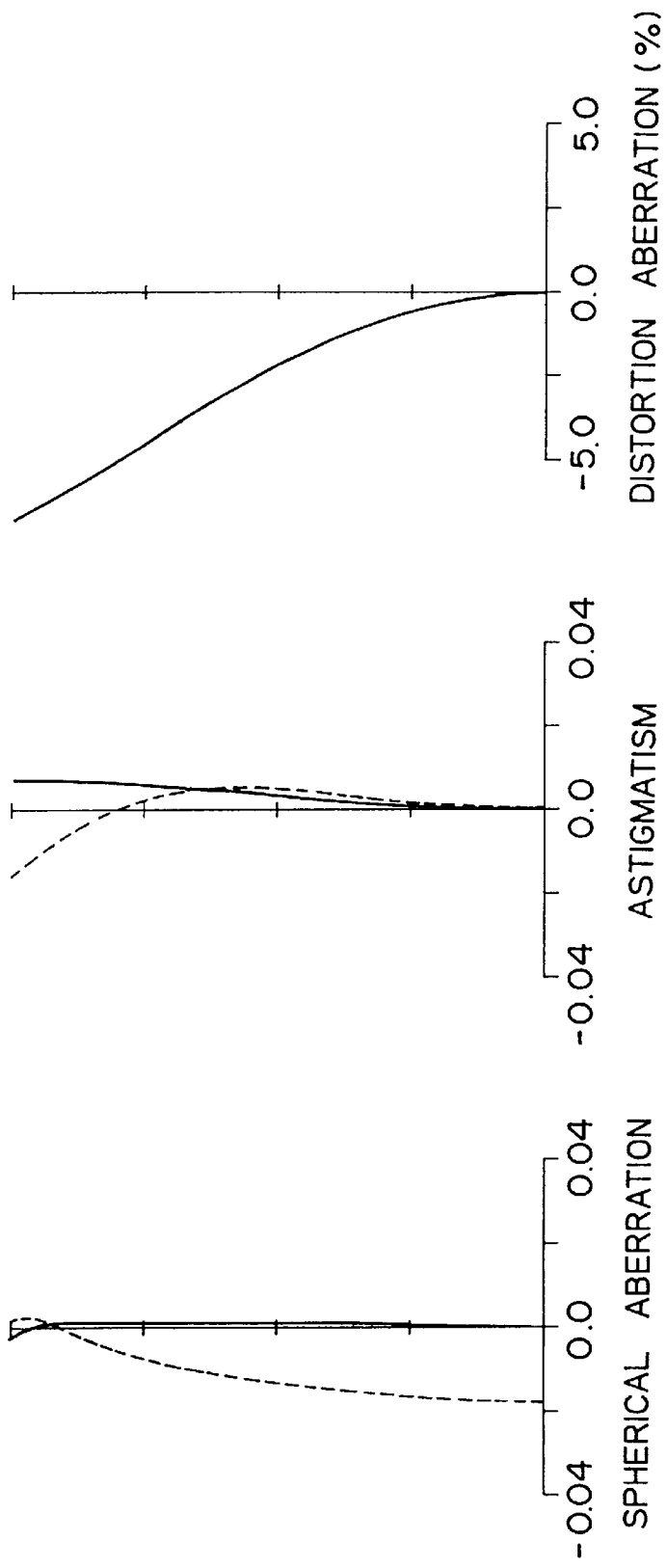

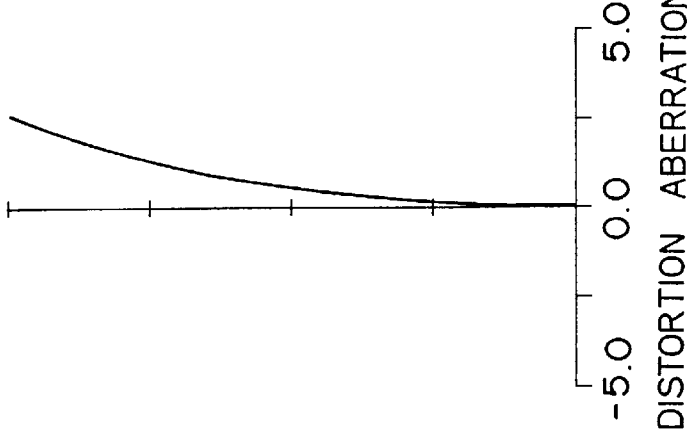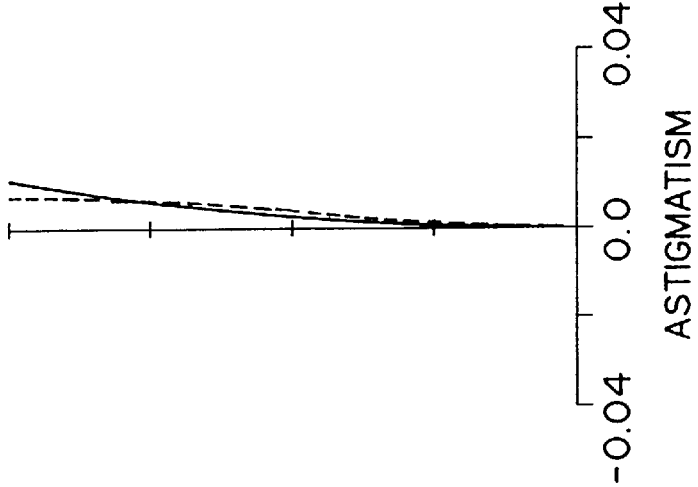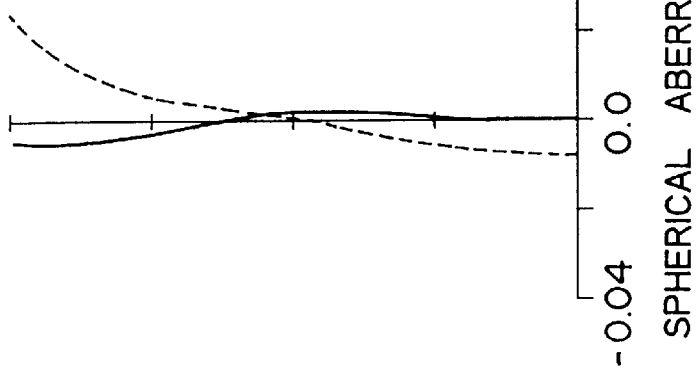

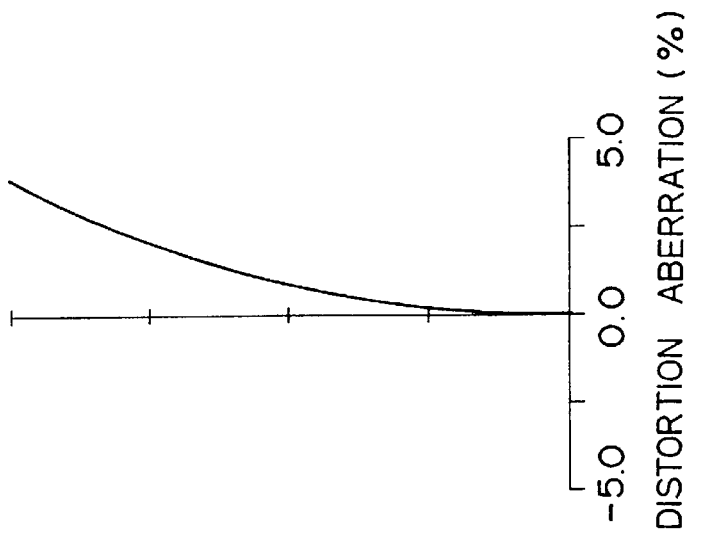
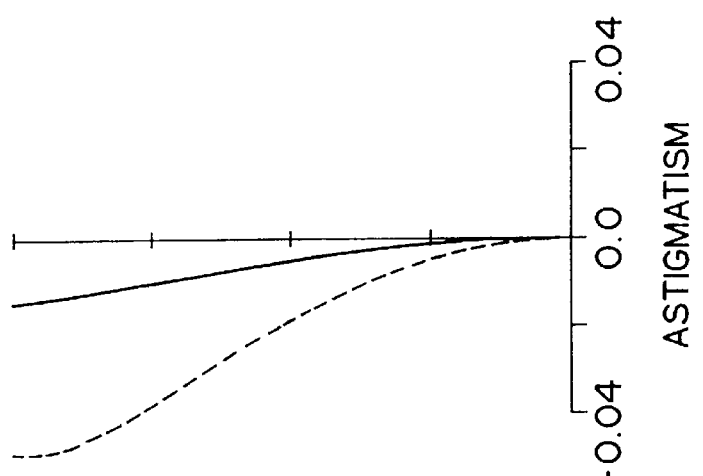
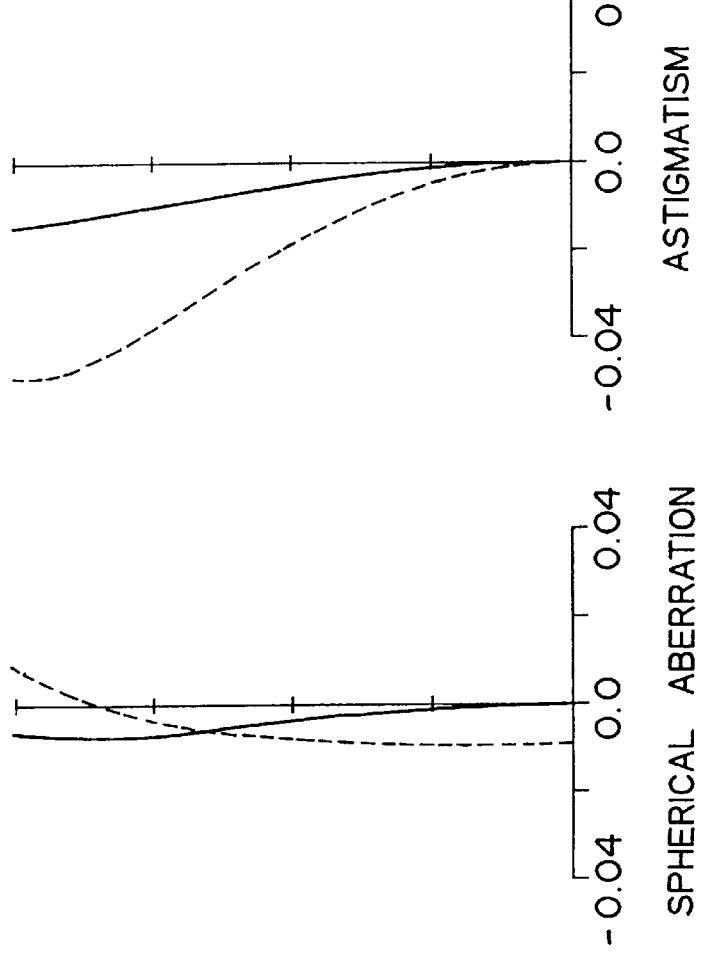

F I G. 4B

| SURFACE | $r_i$ | $d_i$ | $N_i$ | $\nu_i$ |
|---|---|---|---|---|
| 1 | -337.7356 | 0.2683 | 1.69680 | 55.46 |
| 2 | 12.0750 | 1.7153 | | |
| 3 | INFINITY | 2.6827 | 1.72342 | 37.99 |
| 4 | INFINITY | 2.5486 | 1.72342 | 37.99 |
| 5 | INFINITY | 0.1341 | | |
| 6 | 13.3791 | 0.5365 | 1.69680 | 55.46 |
| 7 | 118.9429 | 0.1341 | | |
| 8 | 8.8873 | 0.2951 | 1.84666 | 23.78 |
| 9 | 4.5912 | 1.0244 | 1.62299 | 58.12 |
| 10 | -21.5674 | 0.0537 | | |
| 11 | 4.2153 | 0.4746 | 1.69680 | 55.46 |
| 12 | 8.1645 | VARIABLE | | |
| 13 | 5.5521 | 0.1341 | 1.83400 | 37.34 |
| 14 | 1.2945 | 0.7385 | | |
| 15 | -1.8513 | 0.1341 | 1.65844 | 50.85 |
| 16 | 1.8546 | 0.4476 | 1.84666 | 23.78 |
| 17 | -21.0387 | VARIABLE | | |
| 18 | STOP | 0.1878 | | |
| 19 | 2.1193 | 0.8649 | 1.58913 | 61.25 |
| 20 | 6.5346 | VARIABLE | | |
| 21 | 2.6755 | 0.2146 | 1.84666 | 23.78 |
| 22 | 1.4186 | 1.1656 | 1.58913 | 61.25 |
| 23 | -4.6855 | VARIABLE | | |
| 24 | INFINITY | 0.7276 | 1.51680 | 64.19 |
| 25 | INFINITY | 0.3000 | | |

FIG. 4C

| SURFACE | $A_4$ | $A_6$ | $A_8$ |
|---|---|---|---|
| 20 | 2.13594e-02 | 1.30794e-03 | 4.60137e-04 |
| 23 | 1.11186e-02 | -2.11602e-03 | 1.30411e-05 |

FIG. 4D

| f | 1.0000 | 2.4615 | 9.5692 |
|---|---|---|---|
| $d_{12}$ | 0.2414 | 1.9941 | 3.7468 |
| $d_{17}$ | 3.8943 | 2.1416 | 0.3890 |
| $d_{20}$ | 1.5673 | 0.9349 | 1.9703 |
| $d_{23}$ | 1.9633 | 2.5925 | 1.5684 |

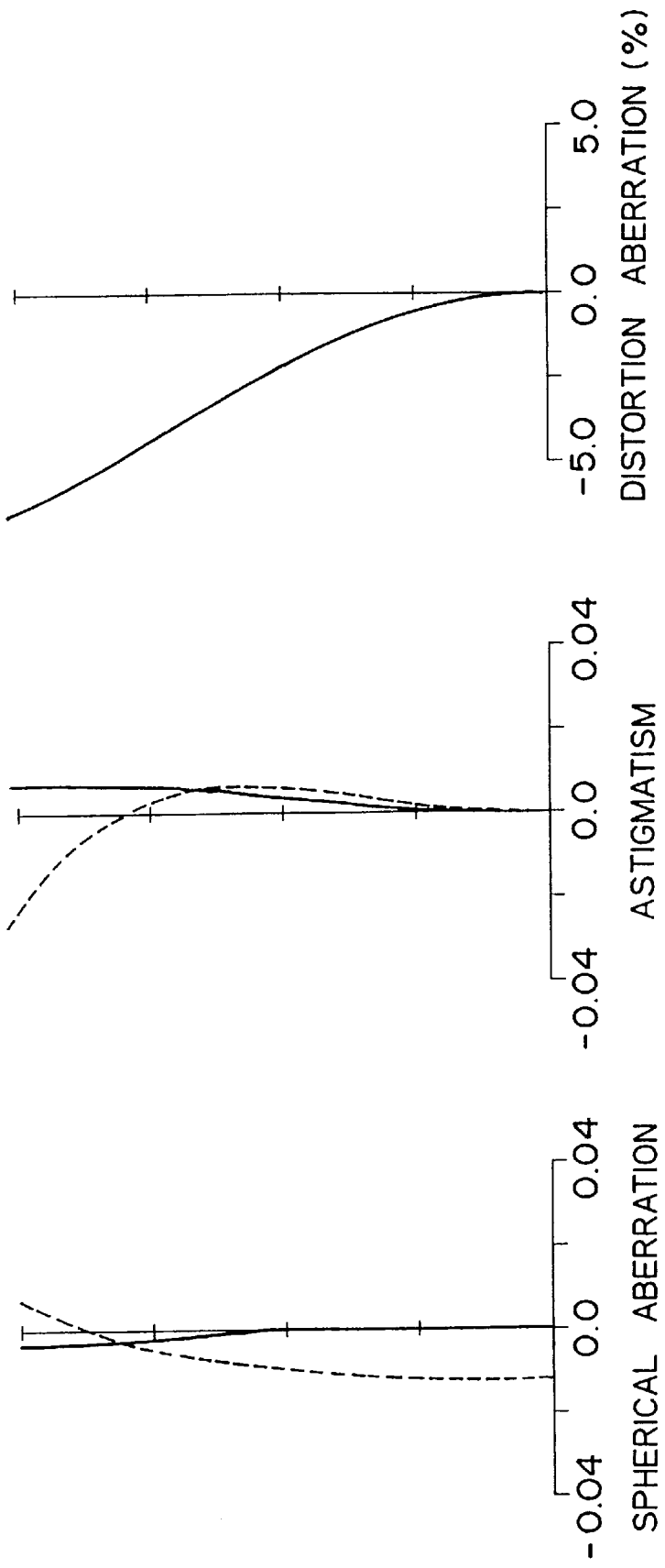

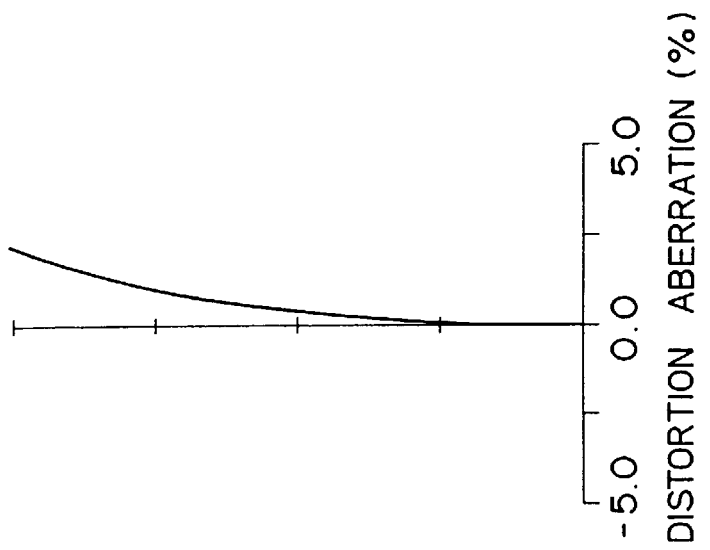
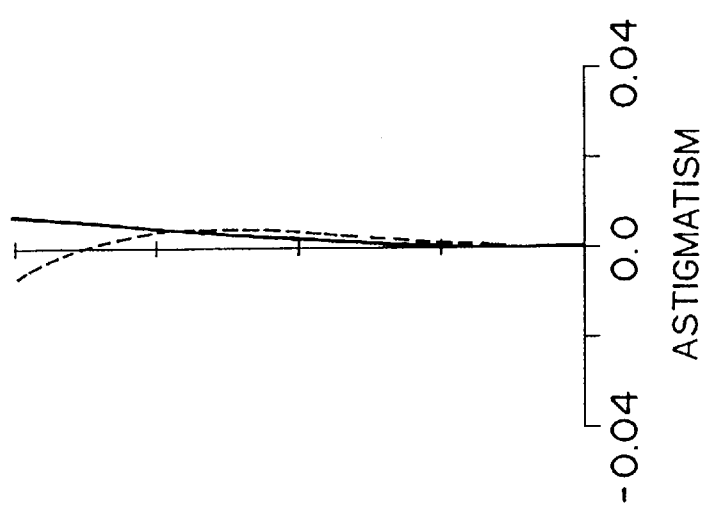
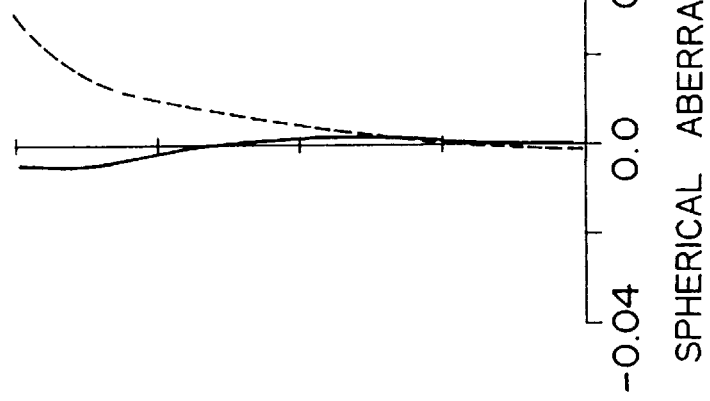

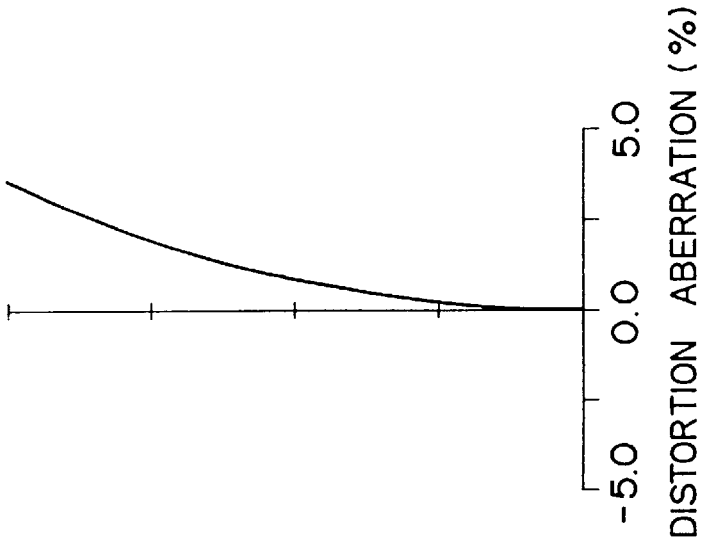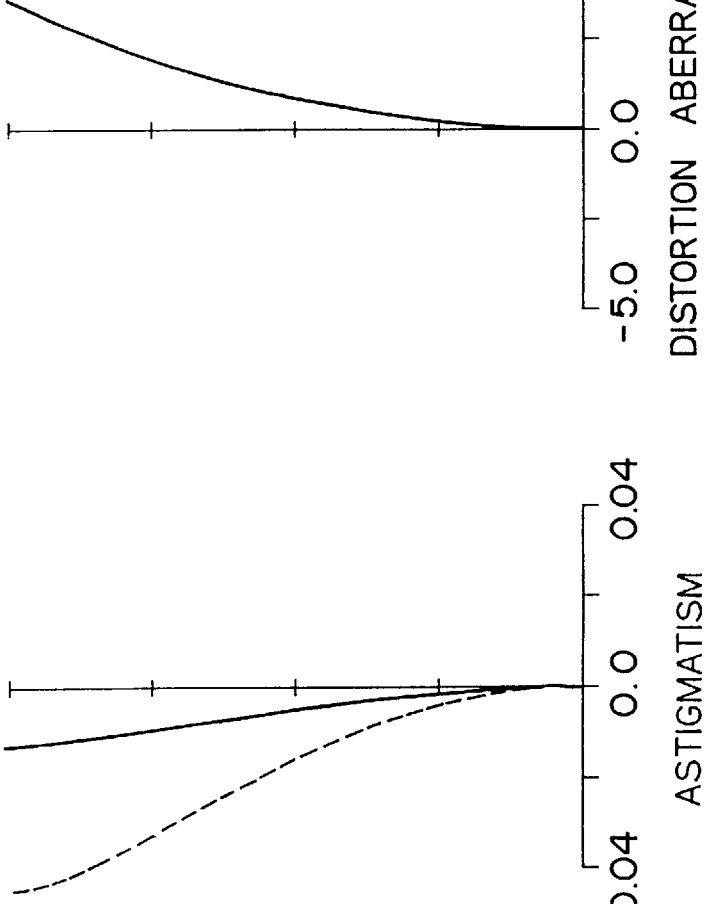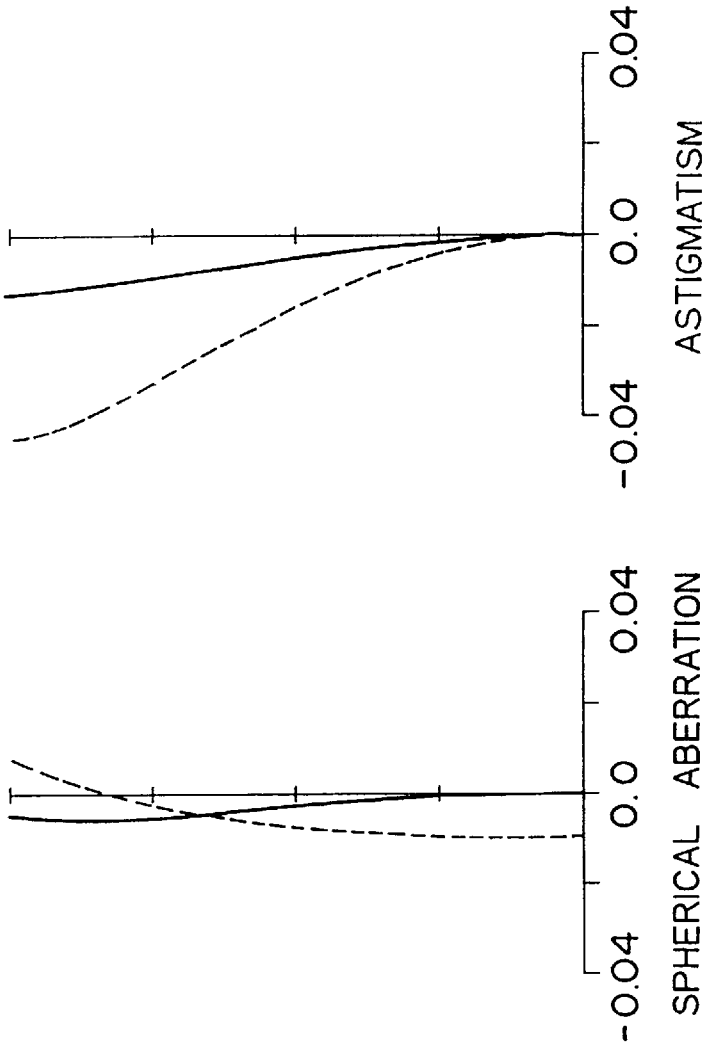

FIG. 6B

| SURFACE | $r_i$ | $d_i$ | $N_i$ | $v_i$ |
|---|---|---|---|---|
| 1 | 134.3890 | 0.3091 | 1.69680 | 55.46 |
| 2 | 10.6382 | 0.0403 | 1.49200 | 58.00 |
| 3 | 10.6382 | 1.6664 | | |
| 4 | INFINITY | 2.6878 | 1.72342 | 37.99 |
| 5 | INFINITY | 2.5534 | 1.72342 | 37.99 |
| 6 | INFINITY | 0.1344 | | |
| 7 | 19.2848 | 0.5107 | 1.58913 | 61.25 |
| 8 | -36.7446 | 0.1344 | | |
| 9 | 14.1646 | 0.2150 | 1.84666 | 23.78 |
| 10 | 6.0677 | 0.7714 | 1.62299 | 58.12 |
| 11 | -29.3156 | 0.0538 | | |
| 12 | 4.9866 | 0.5295 | 1.69680 | 55.46 |
| 13 | 15.6966 | VARIABLE | | |
| 14 | 5.6621 | 0.1075 | 1.83400 | 37.34 |
| 15 | 1.5221 | 0.7795 | | |
| 16 | -2.0782 | 0.1344 | 1.65844 | 50.85 |
| 17 | 2.2532 | 0.3978 | 1.84666 | 23.78 |
| 18 | -22.2924 | VARIABLE | | |
| 19 | STOP | 0.1881 | | |
| 20 | 2.6171 | 0.6988 | 1.69350 | 53.34 |
| 21 | -7.8752 | 0.8708 | | |
| 22 | -17.3007 | 0.1344 | 1.84666 | 23.78 |
| 23 | 4.0599 | VARIABLE | | |
| 24 | 2.4260 | 0.1881 | 1.84666 | 23.78 |
| 25 | 1.6449 | 0.7714 | 1.58913 | 61.25 |
| 26 | -4.1929 | VARIABLE | | |
| 27 | INFINITY | 0.7290 | 1.51680 | 64.19 |
| 28 | INFINITY | 0.3000 | | |

FIG. 6C

| SURFACE | $A_4$ | $A_6$ | $A_8$ |
|---|---|---|---|
| 3 | 5.87907e-06 | -1.84931e-07 | -1.20228e-07 |
| 21 | 1.31194e-02 | -4.48930e-04 | -8.72152e-05 |
| 26 | 1.86015e-02 | 2.69246e-03 | -7.06982e-04 |

FIG. 6D

| f | 1.0000 | 2.4499 | 9.5812 |
|---|---|---|---|
| $d_{13}$ | 0.2419 | 2.3026 | 4.3633 |
| $d_{18}$ | 4.5380 | 2.4773 | 0.4166 |
| $d_{23}$ | 1.2768 | 0.7075 | 1.6739 |
| $d_{26}$ | 1.6108 | 2.1814 | 1.2074 |

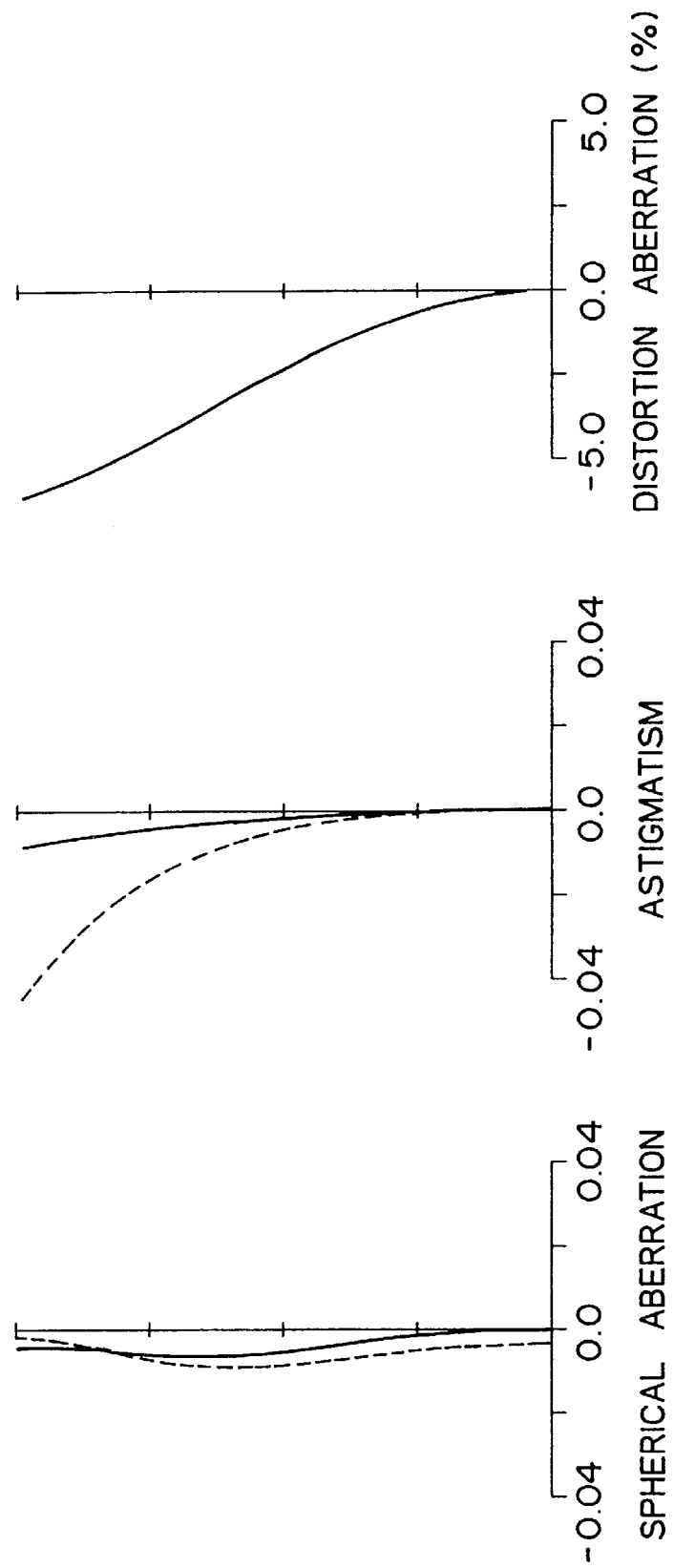

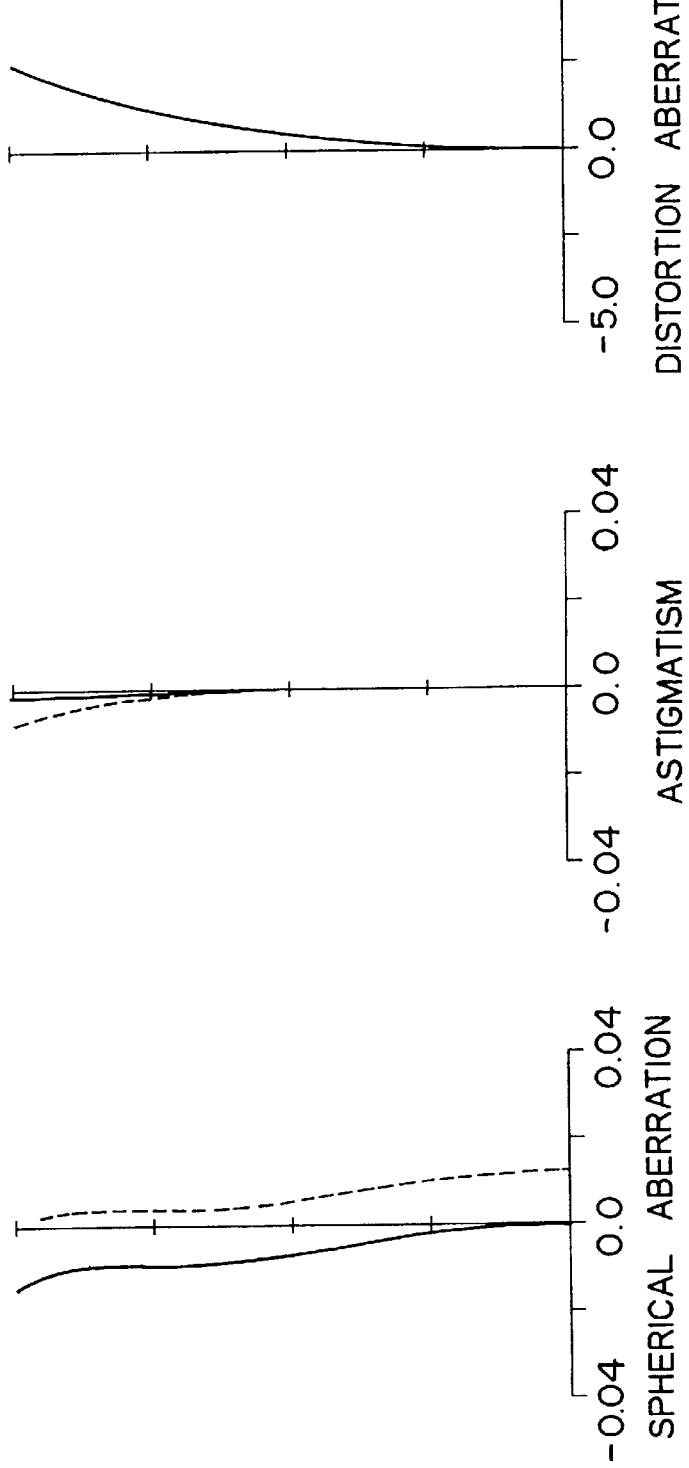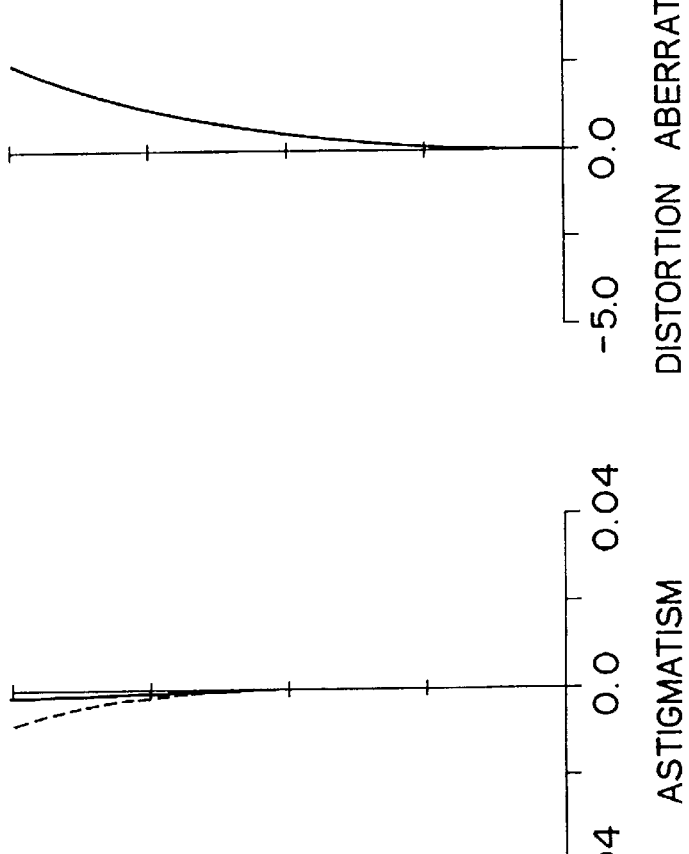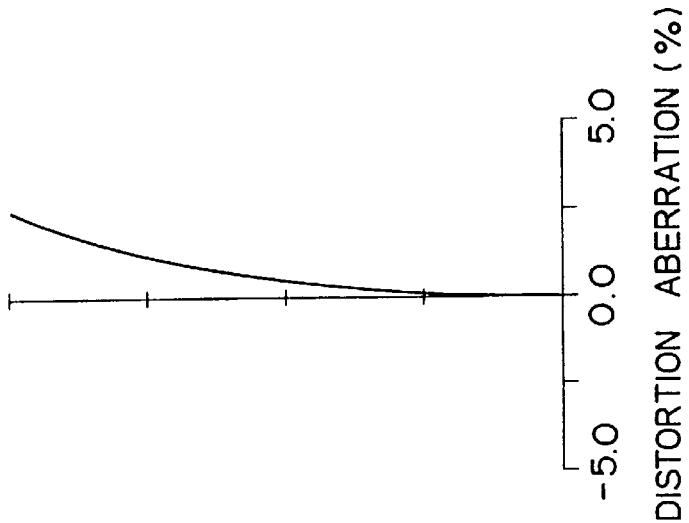

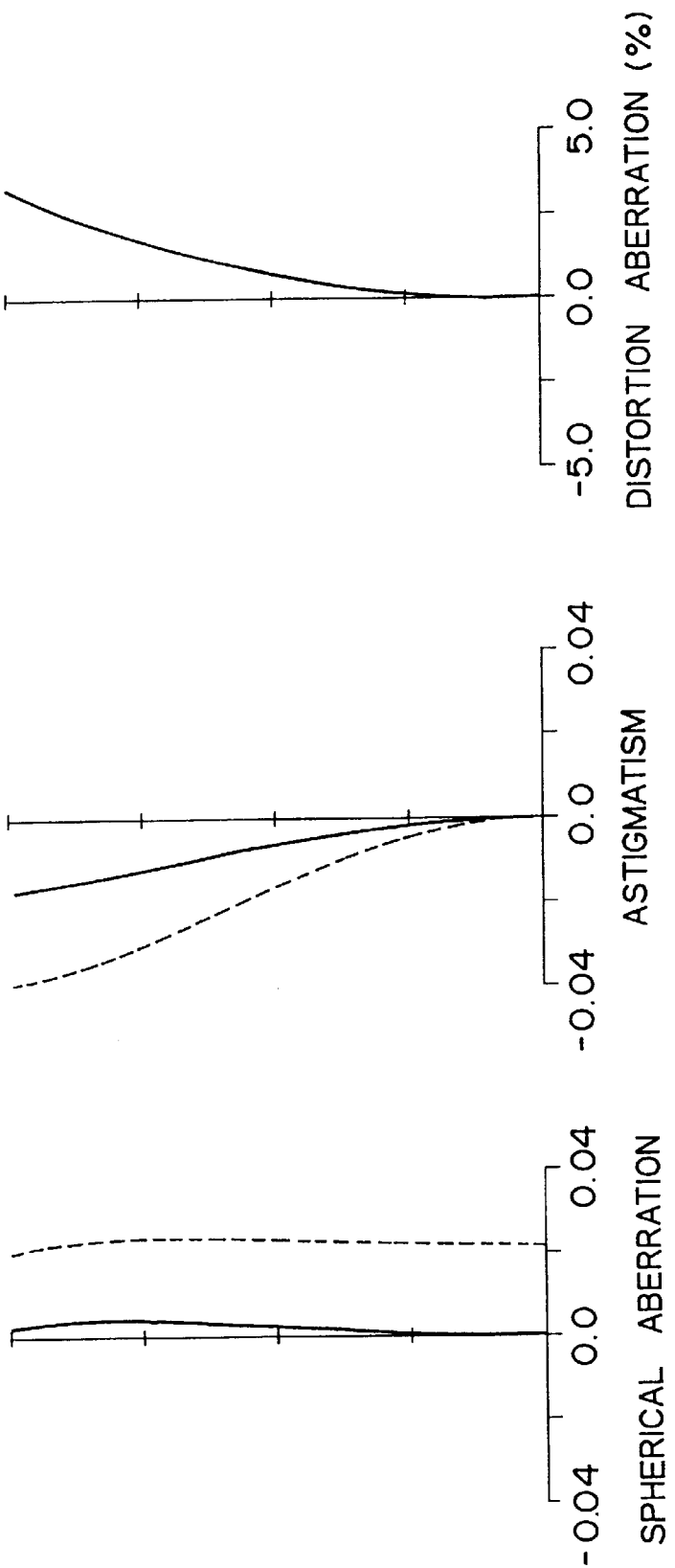

FIG. 8A

| EMBODIMENT | f | FNO | 2ω |
|---|---|---|---|
| 1 | 1.0-9.6 | 1:1.63-3.08 | 65.6-7.0 |
| 2 | 1.0-9.6 | 1:1.63-2.91 | 65.6-7.0 |
| 3 | 1.0-9.6 | 1:1.63-2.86 | 65.2-7.0 |

FIG. 8B

| EMBODIMENT | D1/D1A | /R31/R32/ | /R31/ | R34/R33 | ΣD3/fW | ν3P-ν3N |
|---|---|---|---|---|---|---|
| 1 | 1.297 | -- | -- | -- | -- | -- |
| 2 | 1.394 | -- | -- | -- | -- | -- |
| 3 | 1.364 | 0.332 | -- | -0.235 | 1.704 | 29.56 |

FIG. 9B

| SURFACE | $r_i$ | $d_i$ | $N_i$ | $v_i$ |
|---|---|---|---|---|
| 1 | -337.7356 | 0.2683 | 1.69680 | 55.46 |
| 2 | 12.0750 | 1.7153 | | |
| 3 | INFINITY | 2.6827 | 1.72342 | 37.99 |
| 4 | INFINITY | 2.5486 | 1.72342 | 37.99 |
| 5 | INFINITY | 0.1341 | | |
| 6 | 13.3791 | 0.5365 | 1.69680 | 55.46 |
| 7 | 118.9429 | 0.1341 | | |
| 8 | 8.8873 | 0.2951 | 1.84666 | 23.78 |
| 9 | 4.5912 | 1.0244 | 1.62299 | 58.12 |
| 10 | -21.5674 | 0.0537 | | |
| 11 | 4.2153 | 0.4746 | 1.69680 | 55.46 |
| 12 | 8.1645 | VARIABLE | | |
| 13 | 5.5521 | 0.1341 | 1.83400 | 37.34 |
| 14 | 1.2945 | 0.7385 | | |
| 15 | -1.8513 | 0.1341 | 1.65844 | 50.85 |
| 16 | 1.8546 | 0.4476 | 1.84666 | 23.78 |
| 17 | -21.0387 | VARIABLE | | |
| 18 | STOP | 0.1878 | | |
| 19 | 2.1193 | 0.8649 | 1.58913 | 61.25 |
| 20 | 6.5346 | VARIABLE | | |
| 21 | 2.6755 | 0.2146 | 1.84666 | 23.78 |
| 22 | 1.4186 | 1.1656 | 1.58913 | 61.25 |
| 23 | -4.6855 | VARIABLE | | |
| 24 | INFINITY | 0.7276 | 1.51680 | 64.19 |
| 25 | INFINITY | 0.3000 | | |

FIG. 9C

| SURFACE | $A_4$ | $A_6$ | $A_8$ |
|---|---|---|---|
| 20 | 2.13594e-02 | 1.30794e-03 | 4.60137e-04 |
| 23 | 1.11186e-02 | -2.11602e-03 | 1.30411e-05 |

FIG. 9D

| f | 1.0000 | 2.4615 | 9.5692 |
|---|---|---|---|
| $d_{12}$ | 0.2414 | 1.9941 | 3.7468 |
| $d_{17}$ | 3.8943 | 2.1416 | 0.3890 |
| $d_{20}$ | 1.5673 | 0.9349 | 1.9703 |
| $d_{23}$ | 1.9633 | 2.5925 | 1.5684 |

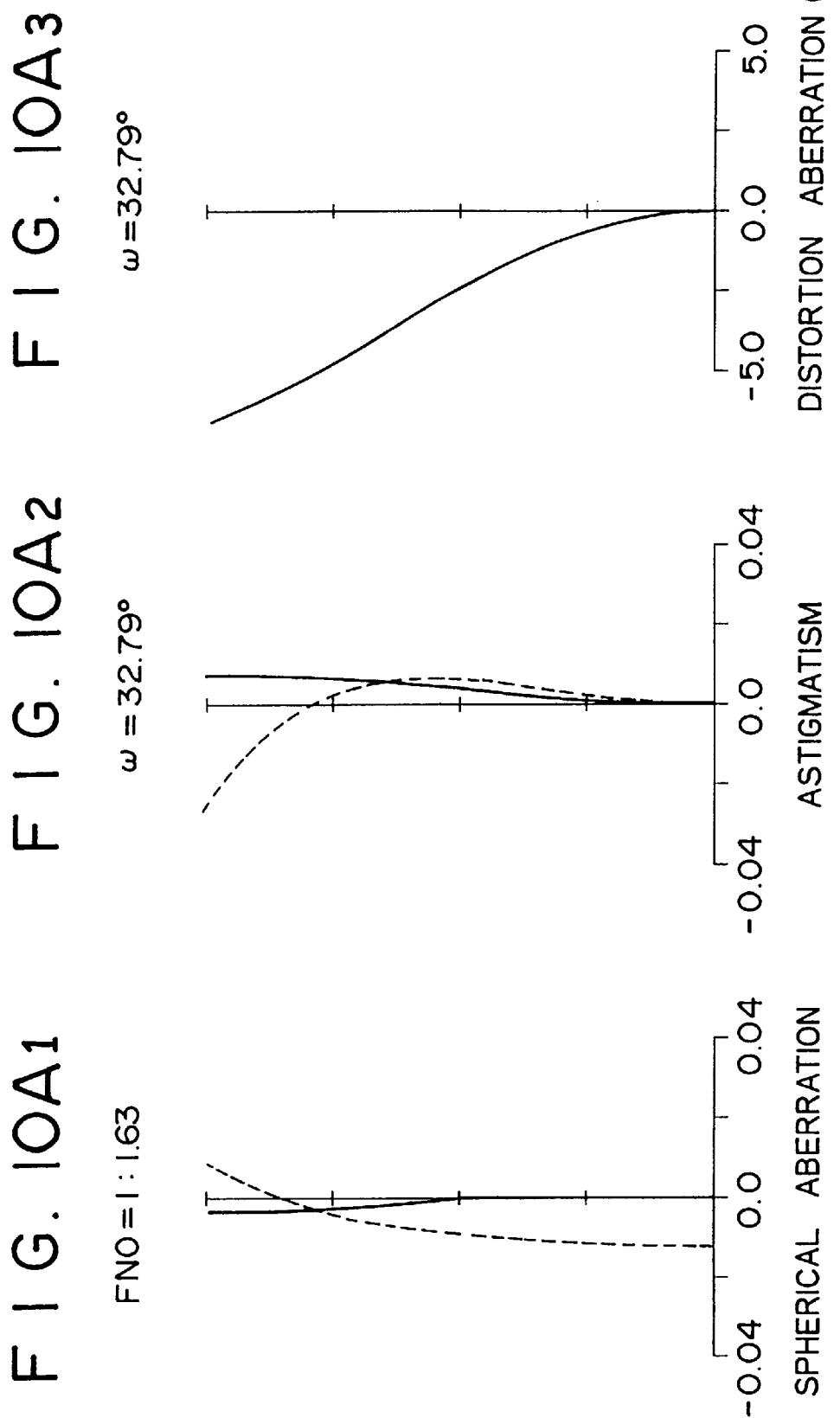

FIG. 10B1  FNO=1:1.85  SPHERICAL ABERRATION (−0.04 to 0.04)

FIG. 10B2  ω=13.52°  ASTIGMATISM (−0.04 to 0.04)

FIG. 10B3  ω=13.52°  DISTORTION ABERRATION (%) (−5.0 to 5.0)

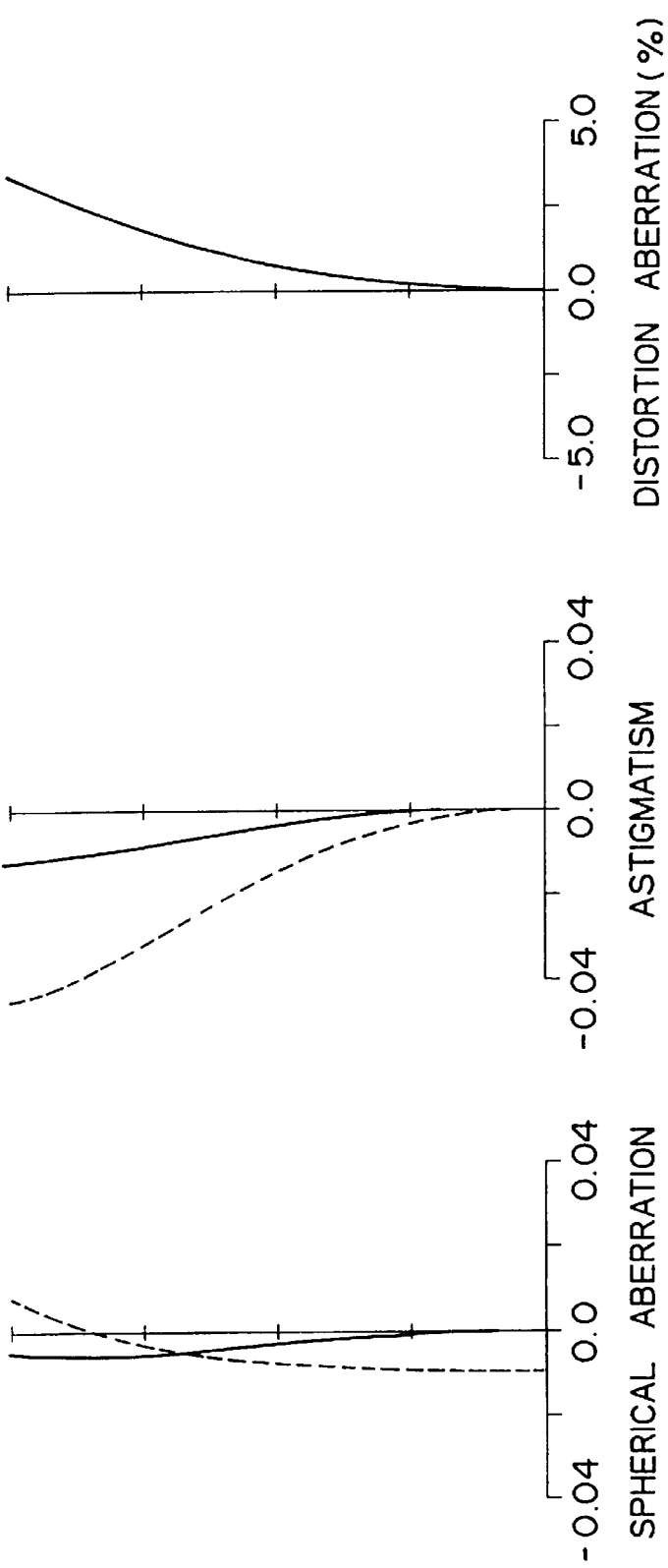

FIG. 11B

| SURFACE | $r_i$ | $d_i$ | $N_i$ | $v_i$ |
|---|---|---|---|---|
| 1 | -651.0159 | 0.2495 | 1.69680 | 55.46 |
| 2 | 11.4980 | 3.4181 | | |
| 3 | INFINITY | 2.2954 | | |
| 4 | 13.5915 | 0.4990 | 1.69680 | 55.46 |
| 5 | 121.7142 | 0.1247 | | |
| 6 | 7.4458 | 0.2744 | 1.84666 | 23.78 |
| 7 | 4.1385 | 0.8038 | 1.62041 | 60.34 |
| 8 | -26.1799 | 0.0499 | | |
| 9 | 4.4938 | 0.3521 | 1.69680 | 55.46 |
| 10 | 8.2991 | VARIABLE | | |
| 11 | 4.0308 | 0.1247 | 1.83400 | 37.34 |
| 12 | 1.2597 | 0.7634 | | |
| 13 | -1.8617 | 0.1247 | 1.64850 | 53.03 |
| 14 | 1.7345 | 0.3994 | 1.84666 | 23.78 |
| 15 | -151.4396 | VARIABLE | | |
| 16 | STOP | 0.1746 | | |
| 17 | 2.1006 | 0.9439 | 1.58913 | 61.25 |
| 18 | 6.0317 | VARIABLE | | |
| 19 | 2.4930 | 0.2609 | 1.84666 | 23.78 |
| 20 | 1.3395 | 1.3525 | 1.58913 | 61.25 |
| 21 | -5.6299 | VARIABLE | | |
| 22 | INFINITY | 0.6767 | 1.51680 | 64.19 |
| 23 | INFINITY | 0.3000 | | |

FIG. 11C

| SURFACE | $A_4$ | $A_6$ | $A_8$ |
|---|---|---|---|
| 18 | 2.13796e-02 | 1.97676e-03 | 5.20549e-04 |
| 21 | 1.08692e-02 | -3.38563e-03 | -1.35395e-04 |

FIG. 11D

| f | 1.0000 | 2.4863 | 9.5741 |
|---|---|---|---|
| $d_{10}$ | 0.2245 | 2.0323 | 3.8401 |
| $d_{15}$ | 3.9773 | 2.1696 | 0.3618 |
| $d_{18}$ | 1.7588 | 1.0377 | 2.1336 |
| $d_{21}$ | 1.9305 | 2.6477 | 1.5642 |

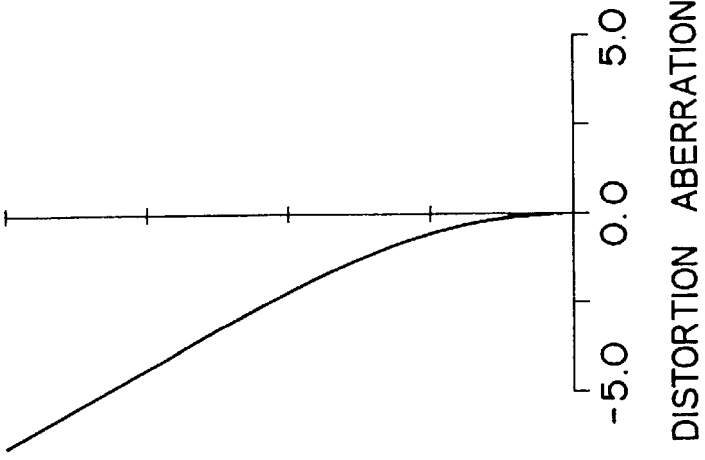
FIG. 12A1  FNO=1:1.63  SPHERICAL ABERRATION
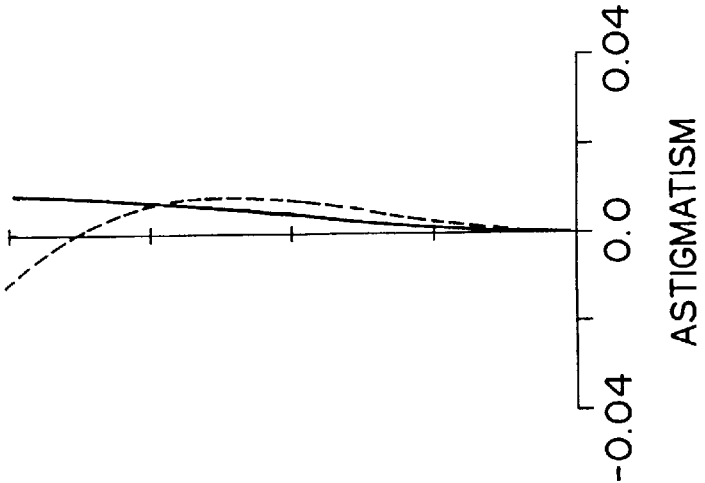
FIG. 12A2  ω=30.87°  ASTIGMATISM
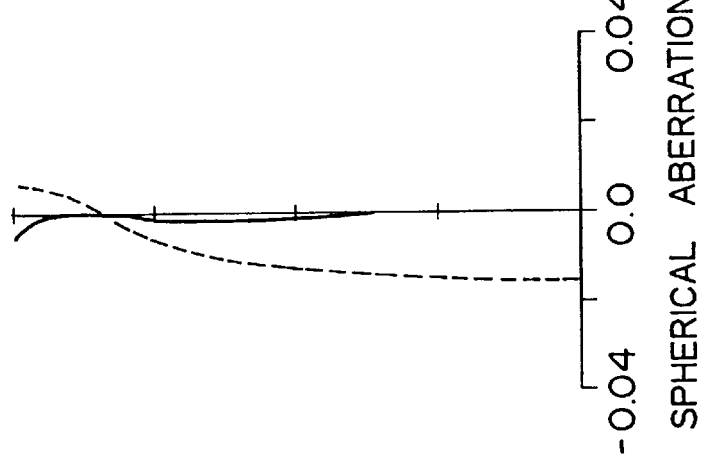
FIG. 12A3  ω=30.87°  DISTORTION ABERRATION (%)

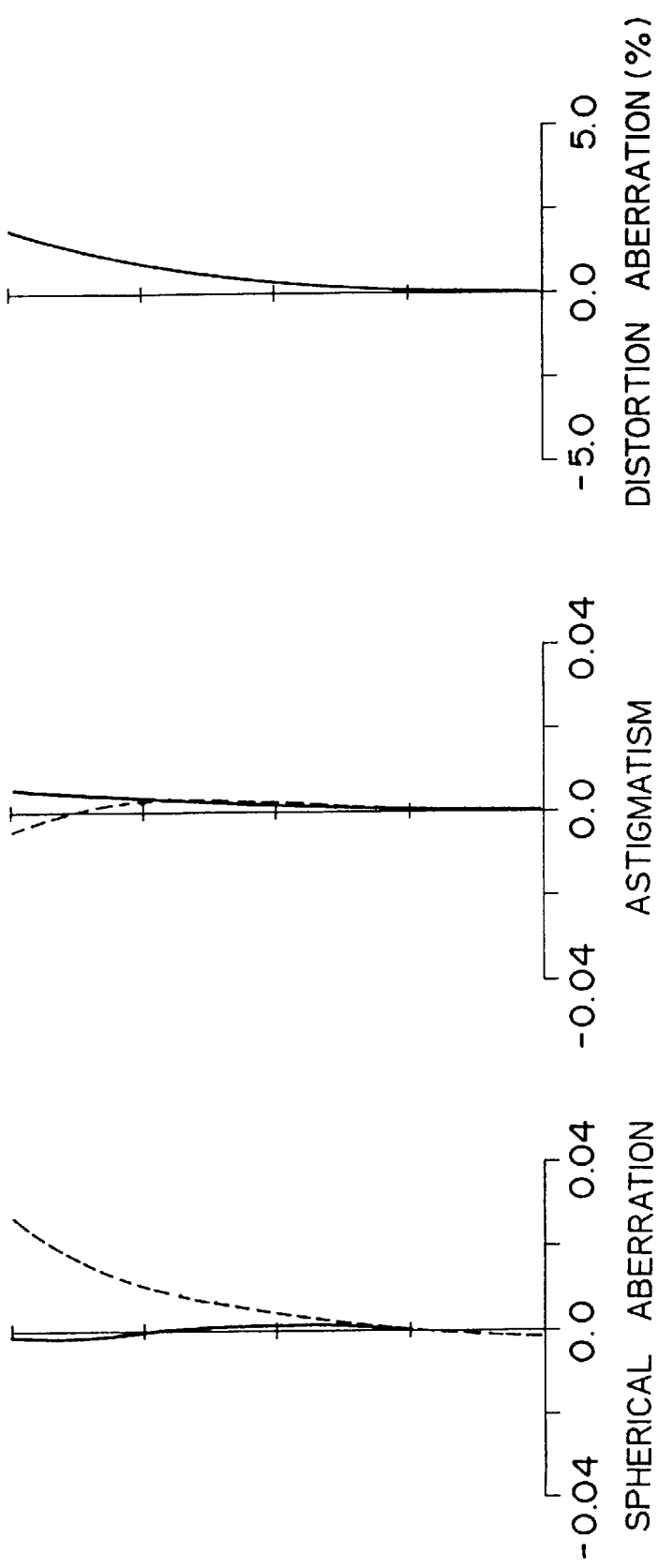

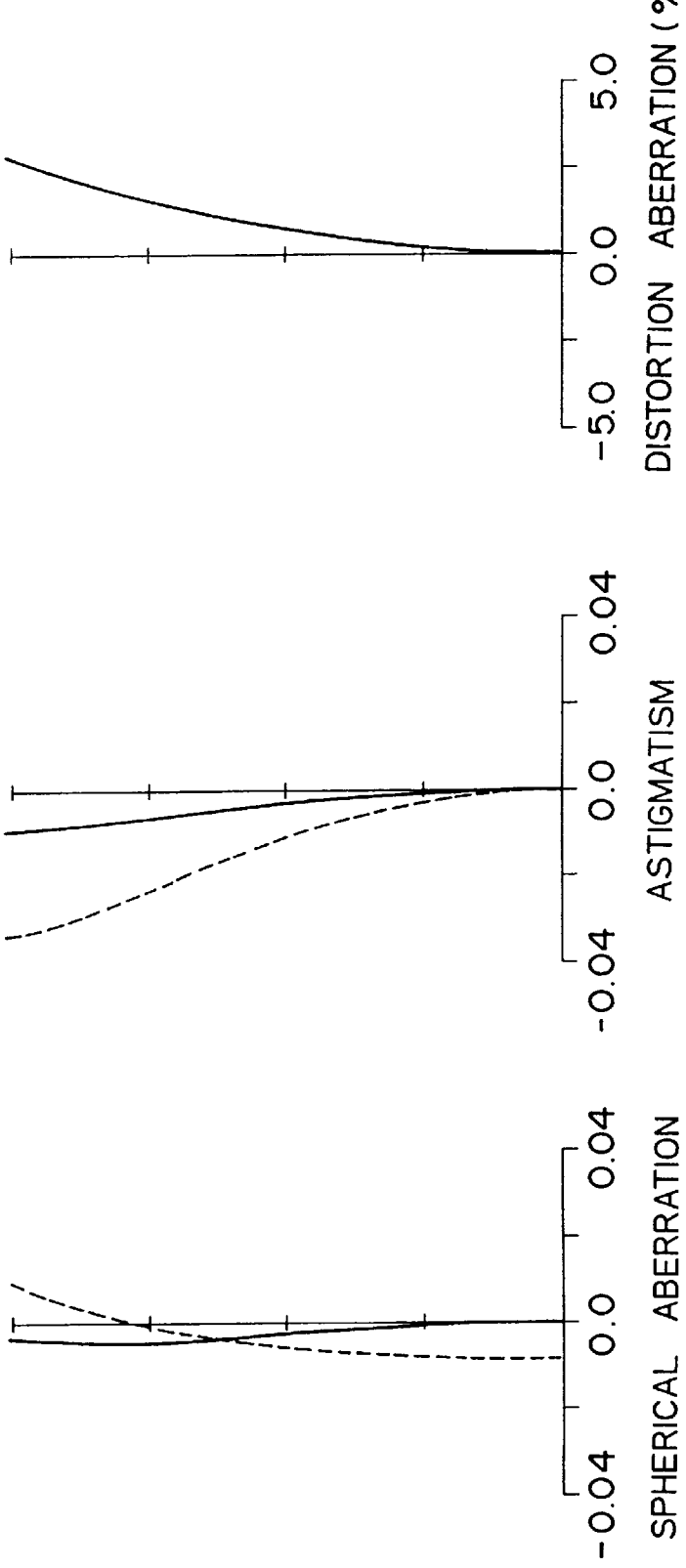

F I G. 13A
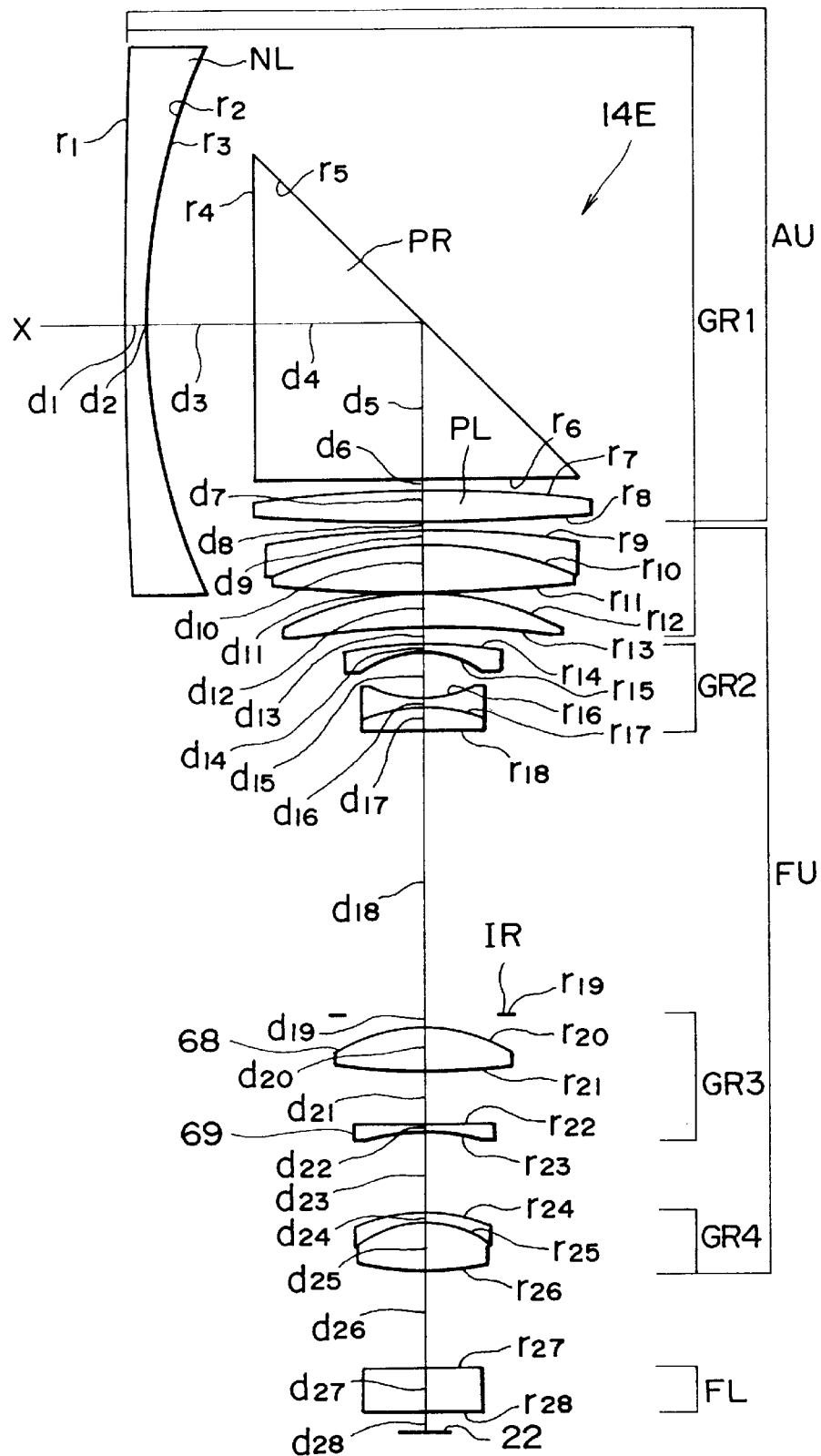

FIG. 13B

| SURFACE | $r_i$ | $d_i$ | $N_i$ | $v_i$ |
|---|---|---|---|---|
| 1 | 134.3890 | 0.3091 | 1.69680 | 55.46 |
| 2 | 10.6382 | 0.0403 | 1.49200 | 58.00 |
| 3 | 10.6382 | 1.6664 | | |
| 4 | INFINITY | 2.6878 | 1.72342 | 37.99 |
| 5 | INFINITY | 2.5534 | 1.72342 | 37.99 |
| 6 | INFINITY | 0.1344 | | |
| 7 | 19.2848 | 0.5107 | 1.58913 | 61.25 |
| 8 | -36.7446 | 0.1344 | | |
| 9 | 14.1646 | 0.2150 | 1.84666 | 23.78 |
| 10 | 6.0677 | 0.7714 | 1.62299 | 58.12 |
| 11 | -29.3156 | 0.0538 | | |
| 12 | 4.9866 | 0.5295 | 1.69680 | 55.46 |
| 13 | 15.6966 | VARIABLE | | |
| 14 | 5.6621 | 0.1075 | 1.83400 | 37.34 |
| 15 | 1.5221 | 0.7795 | | |
| 16 | -2.0782 | 0.1344 | 1.65844 | 50.85 |
| 17 | 2.2532 | 0.3978 | 1.84666 | 23.78 |
| 18 | -22.2924 | VARIABLE | | |
| 19 | STOP | 0.1881 | | |
| 20 | 2.6171 | 0.6988 | 1.69350 | 53.34 |
| 21 | -7.8752 | 0.8708 | | |
| 22 | -17.3007 | 0.1344 | 1.84666 | 23.78 |
| 23 | 4.0599 | VARIABLE | | |
| 24 | 2.4260 | 0.1881 | 1.84666 | 23.78 |
| 25 | 1.6449 | 0.7714 | 1.58913 | 61.25 |
| 26 | -4.1929 | VARIABLE | | |
| 27 | INFINITY | 0.7290 | 1.51680 | 64.19 |
| 28 | INFINITY | 0.3000 | | |

FIG. 13C

| SURFACE | $A_4$ | $A_6$ | $A_8$ |
|---|---|---|---|
| 3 | 5.87907e-06 | -1.84931e-07 | -1.20228e-07 |
| 21 | 1.31194e-02 | -4.48930e-04 | -8.72152e-05 |
| 26 | 1.86015e-02 | 2.69246e-03 | -7.06982e-04 |

FIG. 13D

| f | 1.0000 | 2.4499 | 9.5812 |
|---|---|---|---|
| $d_{13}$ | 0.2419 | 2.3026 | 4.3633 |
| $d_{18}$ | 4.5380 | 2.4773 | 0.4166 |
| $d_{23}$ | 1.2768 | 0.7075 | 1.6739 |
| $d_{26}$ | 1.6108 | 2.1814 | 1.2074 |

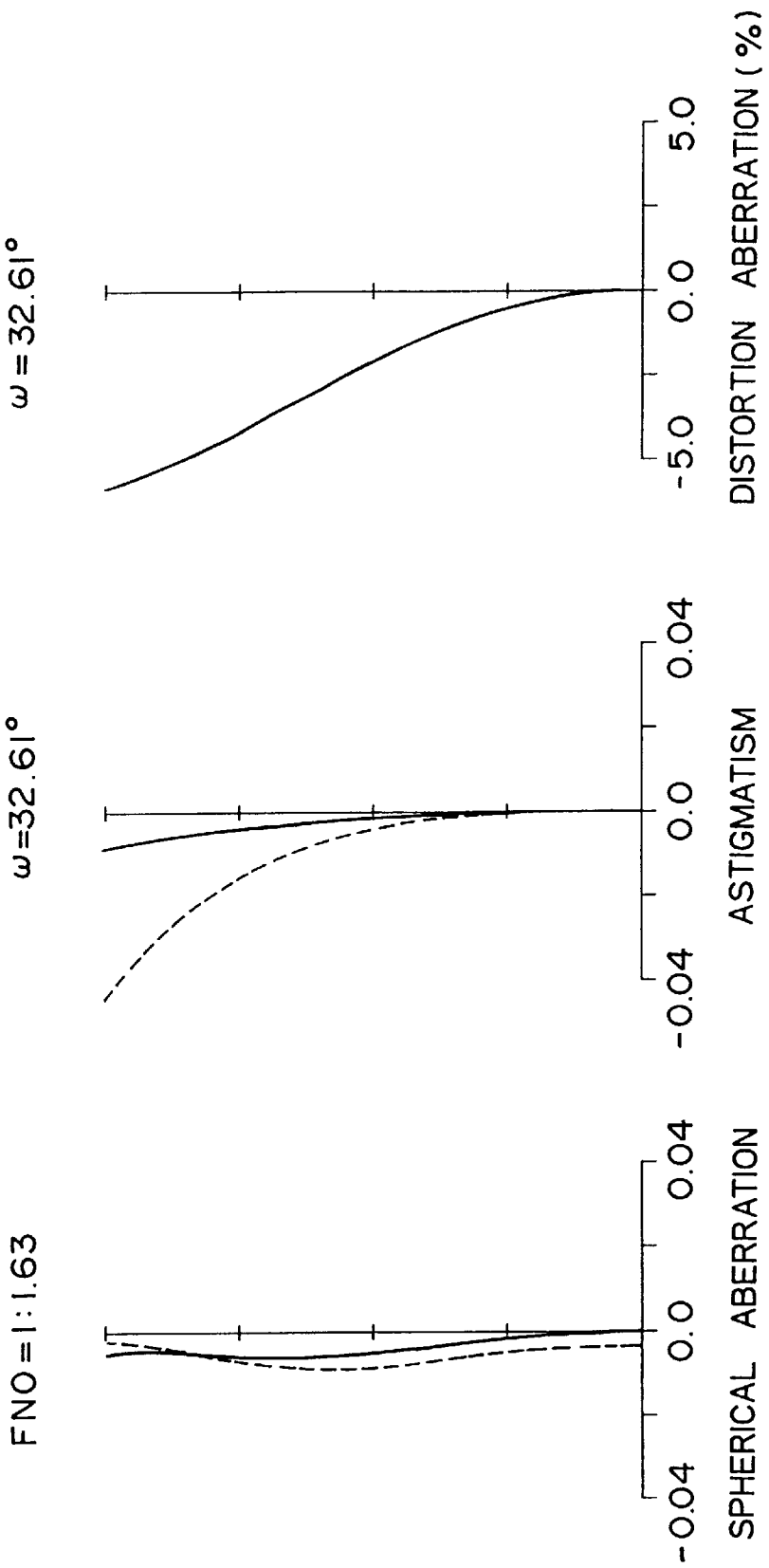

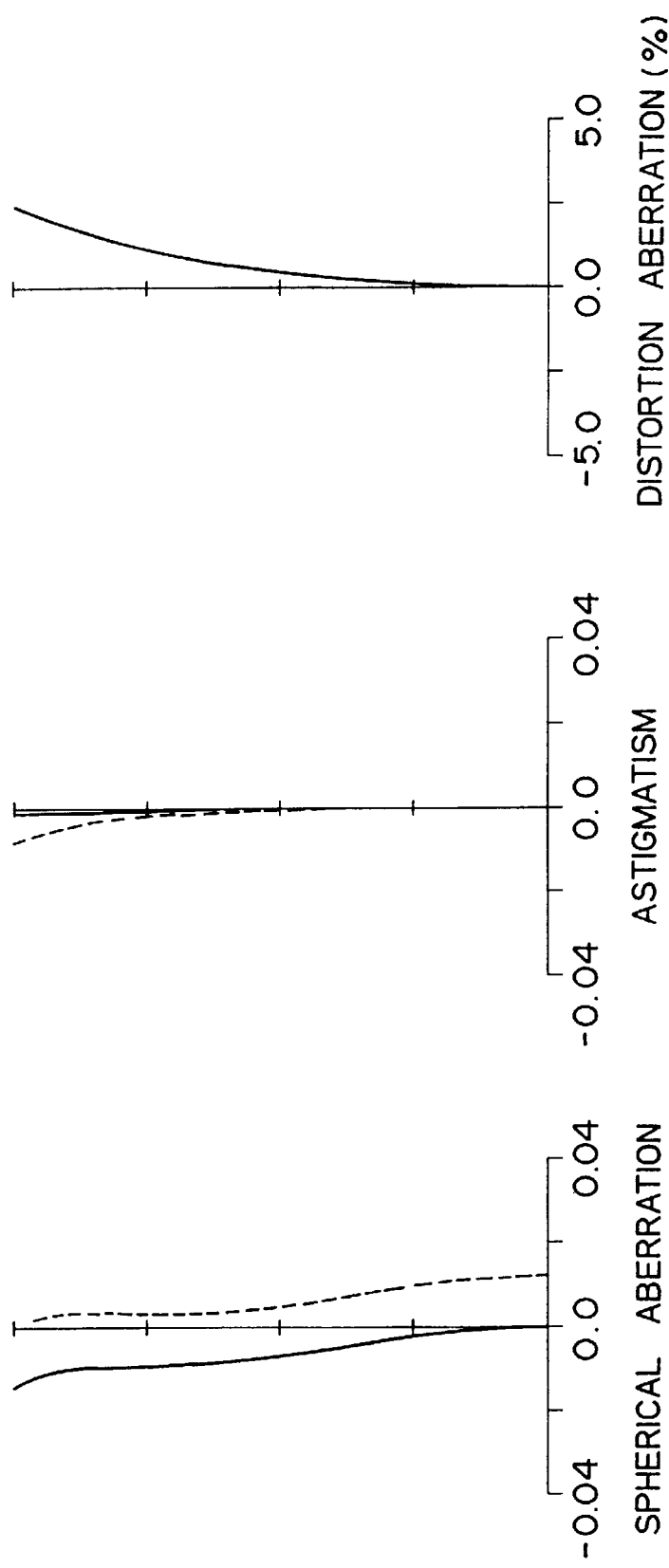

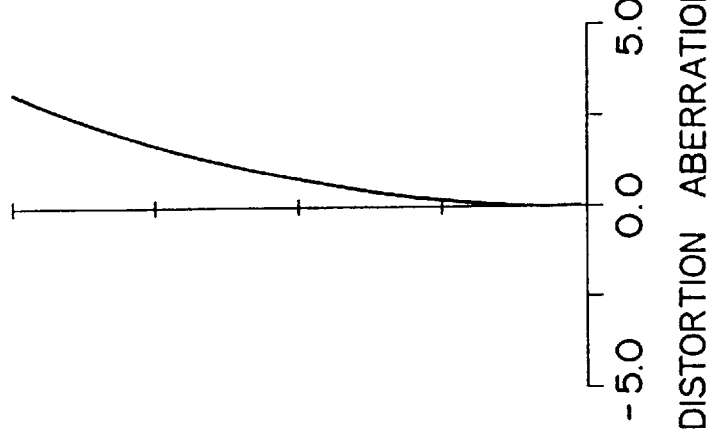
FIG. 14C1  FIG. 14C2  FIG. 14C3
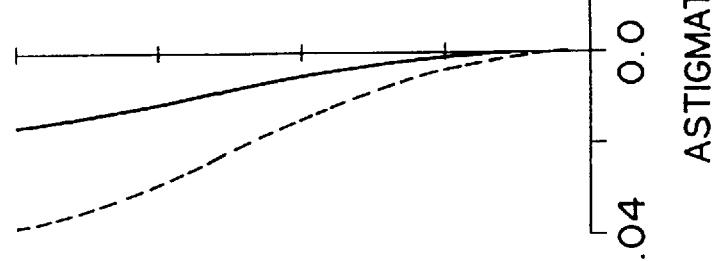
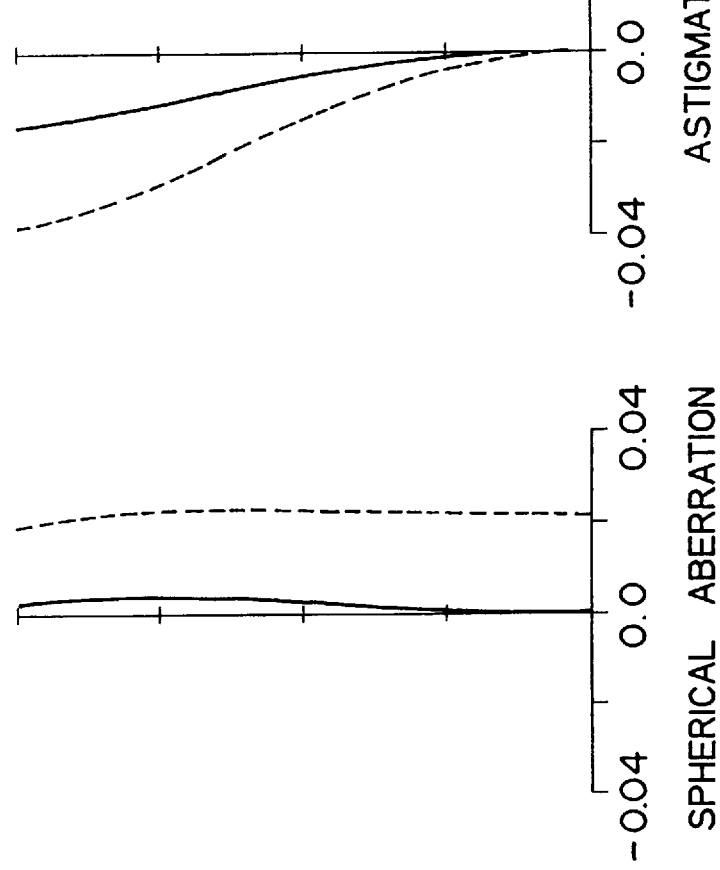

COMPACT IMAGE PICKUP LENS SYSTEM FOR A VIDEO CAMERA

BACKGROUND OF THE INVENTION

The present invention is related to optical lenses and, in particular, an image pickup lens system used in a video camera.

Recently, reduction in size and weight of a video camera, i.e., its miniaturization, has become a significant and almost indispensable factor in bringing a successful product to market. It is apparent that the principal route to the miniaturization of the camera is to decrease the size of an image pickup lens system.

Namely, it is considered that largely two elements in the image pickup lens system determine the progress of camera miniaturization: the size of a solid-state image sensing device, i.e., a charged-coupled device (CCD), and the number of parts in a lens array. Various ways to reduce parts in the lens array, for example, are to include an inner focus lens, as disclosed in Japanese Patent Application Laid-Open No. 62-24213 (1987), or an aspherical lens, as disclosed in Japanese Patent Application Laid-Open No. 3-33710 (1991).

In the image pickup lens system of the video camera such as described in the above-mentioned patent applications, lenses that are components of the image pickup lens system are arranged in a straight line. That is, an optical axis extending from an object side to an image side forms a straight line. As a result, the miniaturization of a video camera with such a lens arrangement is quite limited, even if other steps for miniaturization have been taken into account. Clearly, the lenses arrayed along a straight line present an obstacle to the overall camera length reduction and impose restrictions on the camera design.

In addition or in place of a general lens, a zoom lens has been used frequently in the image pickup lens system of the video camera. Since the zoom lens is typically larger than the general lens, the problem of miniaturization is even more pronounced in this case.

To reduce the overall camera size with either the zoom lens or general lens, it is possible to arrange the lenses in a non-linear configuration, i.e., to fold the optical axis of the image pickup lens system so that the lenses are positioned at right angles to each other, for example. Namely, as disclosed in Japanese Patent Application Laid-Open No. 7-13073 (1995), a mirror is located between a wide-angle converter lens and a master lens (zoom lens) for folding the optical axis of the system. However, the attendant deterioration of the imaging performance has been difficult to solve in these devices due to mass production errors. Since high precision in assembling the lens system is difficult to achieve during mass production, this problem has been greatly exacerbated in image pickup lens systems with non-linear optical axes.

It is also desirable to provide a wide-angle lens, in combination with the zoom lens, in the video camera. The field of view of the wide-angle lens should be as wide as possible. The wide-angle lens, as disclosed, for example, in Japanese Patent Application Laid-Open No. 6-324265 (1994) is composed of four groups (positive, negative, positive and positive groups, counting from the object to the image side) and has a field angle of 60 degrees.

Therefore, it appears that a miniaturized zoom lens having a wide angle field of view can be obtained by merely combining the techniques disclosed in the above-mentioned two applications. Various problems, however, are encountered in such apparently simple combination.

In particular, in the image pickup lens system disclosed in the 7-13073 application, a mirror is positioned between the wide-angle converter lens and the master lens (zoom lens) to fold the optical axis of the image pickup lens system. To achieve the desired wide angle field of view, the master lenses would have to be enlarged causing a corresponding increase in the physical size and weight of the camera. Similarly, if a reflecting member such as a mirror is added to the zoom lens of the 6-324265 application to fold the optical axis, the lens must be also increased in size to provide the desired zoom function.

Thus, it has been very difficult to obtain miniaturization of a video camera which combines, for example, a zoom lens with a wide-angle lens.

OBJECTS OF THE INVENTION

It is, therefore, an object of the invention to provide a compact video camera with a zooming function and wide angle field of view.

It is another object of the invention to provide a video camera with a compact image pickup lens system which has wider tolerances for easier assembly of lenses in the system.

It is still another object of the invention to provide a video camera with a compact image pickup lens system comprising a zoom lens and a wide-angle converter.

It is yet another object of the invention to provide an image pickup lens system with a zoom lens and a wide-angle converter such that the optical axis of the lens system is folded between its object side and its image side.

It is yet another object of the invention to provide an image pickup lens system with a zoom lens and a wide-angle converter such that the optical axis of the lens system is folded closer to its object side than its image side.

SUMMARY OF THE INVENTION

These and other objects, features and advantages are accomplished by an integrated video camera and recording/reproducing apparatus. The inventive apparatus comprises a main body including a viewfinder portion, a recording/reproducing portion, and an image pickup lens system having an object side, an image side and an optical axis. The a image pickup lens system includes a zoom lens and a wide angle converter. The wide angle converter includes at least a negative lens and a positive lens spaced apart from each other such that D1/D1A is greater than 1.2 and less than 1.7 where D1 is a distance between a lens surface of the negative lens closest to the object side and a lens surface of the positive lens closest to the image side, and D1A is a distance between the negative lens and the positive lens.

In accordance with one aspect of the invention, the inventive apparatus further includes a reflecting member located between the negative and positive lens with the optical axis folded. The optical axis is folded at a position which is closer to the object side than the image side of the apparatus.

In accordance with another aspect of the invention, an image pickup lens system for a video camera comprises a zoom lens located at an image side of the image pickup lens system and a wide angle converter located at an object side of the image pickup lens system and optically coupled to the zoom lens. The wide angle converter includes a first lens group having at least a negative lens group and a positive lens group spaced apart from each other such that D1/D1A is greater than 1.2 and less than 1.7 where D1 is a distance between a lens surface of the first lens group closest to the object side and a lens surface of the first lens group closest to the image side, and D1A is a distance between the negative lens group and the positive lens group.

In accordance with still another aspect of the present invention, the second lens group is moveable between the first and third groups in response to a zooming operation between a wide angle end and a telephoto end of the image pickup lens system.

In accordance with yet another aspect of the present invention, the fourth group is moveable between the third lens group and the image side for focusing an image as a function of the zooming operation.

In accordance with still further aspect of the present invention, the inventive apparatus further includes a reflecting member, such as a prism or mirror, located between the negative and positive lens groups with the common optical axis folded therebetween. The common optical axis is folded, at substantially 90 degrees, at a position which is closer to the object side than the image side of the apparatus.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which:

FIGS. 1A and 1B show a perspective view of a compact, lightweight integrated video camera and recording/reproducing apparatus which incorporates an image pickup lens system in accordance with the present invention;

FIG. 2B is a table of values for lenses in the first embodiment;

FIG. 2C is a table of the 4th, 6th and the 8th-order aspherical coefficients A4, A6 and A8, respectively, for aspherical surfaces in the first embodiment;

FIG. 2D is a table of values for certain key distances in the lens system of the first embodiment;

FIGS. 3A, 3B, 3C are diagrams showing spherical aberration, astigmatism and distortion aberration in the wide angle, normal, and telephoto states of the zooming operation, respectively, in accordance with the first embodiment of the present invention;

FIG. 4B is a table of values for lenses in the second embodiment;

FIG. 4C is a table of the 4th, 6th and the 8th-order aspherical coefficients A4, A6 and A8, respectively, for aspherical surfaces in the second embodiment;

FIG. 4D is a table of values for certain key distances in the lens system of the second embodiment;

FIGS. 5A, 5B, 5C are diagrams showing spherical aberration, astigmatism and distortion aberration in the wide angle, normal, and telephoto states of the zooming operation, respectively, in accordance with the second embodiment of the present invention;

FIG. 6B is a table of values for lenses in the third embodiment;

FIG. 6C is a table of the 4th, 6th and the 8th-order aspherical coefficients A4, A6 and A8, respectively, for aspherical surfaces in the third embodiment;

FIG. 6D is a table of values for certain key distances in the lens system of the third embodiment;

FIGS. 7A, 7B, 7C are diagrams showing spherical aberration, astigmatism and distortion aberration in the wide angle, normal, and telephoto states of the zooming operation, respectively, in accordance with the third embodiment of the present invention;

FIG. 8A is a table of values for f, FNO and 2ω in the first, second and third embodiments of the present invention;

FIG. 8B is a table of values for the conditional expressions (1) through (5) in the first, second and third embodiments of the present invention;

FIG. 9B is a table of values for lenses in the fourth embodiment;

FIG. 9C is a table of the 4th, 6th and the 8th-order aspherical coefficients A4, A6 and A8, respectively, for aspherical surfaces in the fourth embodiment;

FIG. 9D is a table of values for certain key distances in the lens system of the fourth embodiment;

FIGS. 10A, 10B, 10C are diagrams showing spherical aberration, astigmatism and distortion aberration in the wide angle, normal, and telephoto states of the zooming operation, respectively, in accordance with the fourth embodiment of the present invention;

FIG. 11B is a table of values for lenses in the fifth embodiment;

FIG. 11C is a table of the 4th, 6th and the 8th-order aspherical coefficients A4, A6 and A8, respectively, for aspherical surfaces in the fifth embodiment;

FIG. 11D is a table of values for certain key distances in the lens system of the fifth embodiment;

FIGS. 12A, 12B, 12C are diagrams showing spherical aberration, astigmatism and distortion aberration in the wide angle, normal, and telephoto states of the zooming operation, respectively, in accordance with the fifth embodiment of the present invention;

FIG. 13A is a schematic diagram of a sixth embodiment of the image pickup lens system according to the present invention in correspondence with FIGS. 13B, 13C, 13D, 14A, 14B and 14C;

FIG. 13B is a table of values for lenses in the sixth embodiment;

FIG. 13C is a table of the 4th, 6th and the 8th-order aspherical coefficients A4, A6 and A8, respectively, for aspherical surfaces in the sixth embodiment;

FIG. 13D is a table of values for certain key distances in the lens system of the sixth embodiment;

FIGS. 14A, 14B, 14C are diagrams showing spherical aberration, astigmatism and distortion aberration in the wide angle, normal, and telephoto states of the zooming operation, respectively, in accordance with the sixth embodiment of the present invention.

In all Figures, like reference numerals represent the same or identical components of the present invention.

DETAILED DESCRIPTION OF THE PREFERRED EMBODIMENTS

Figure 2A:
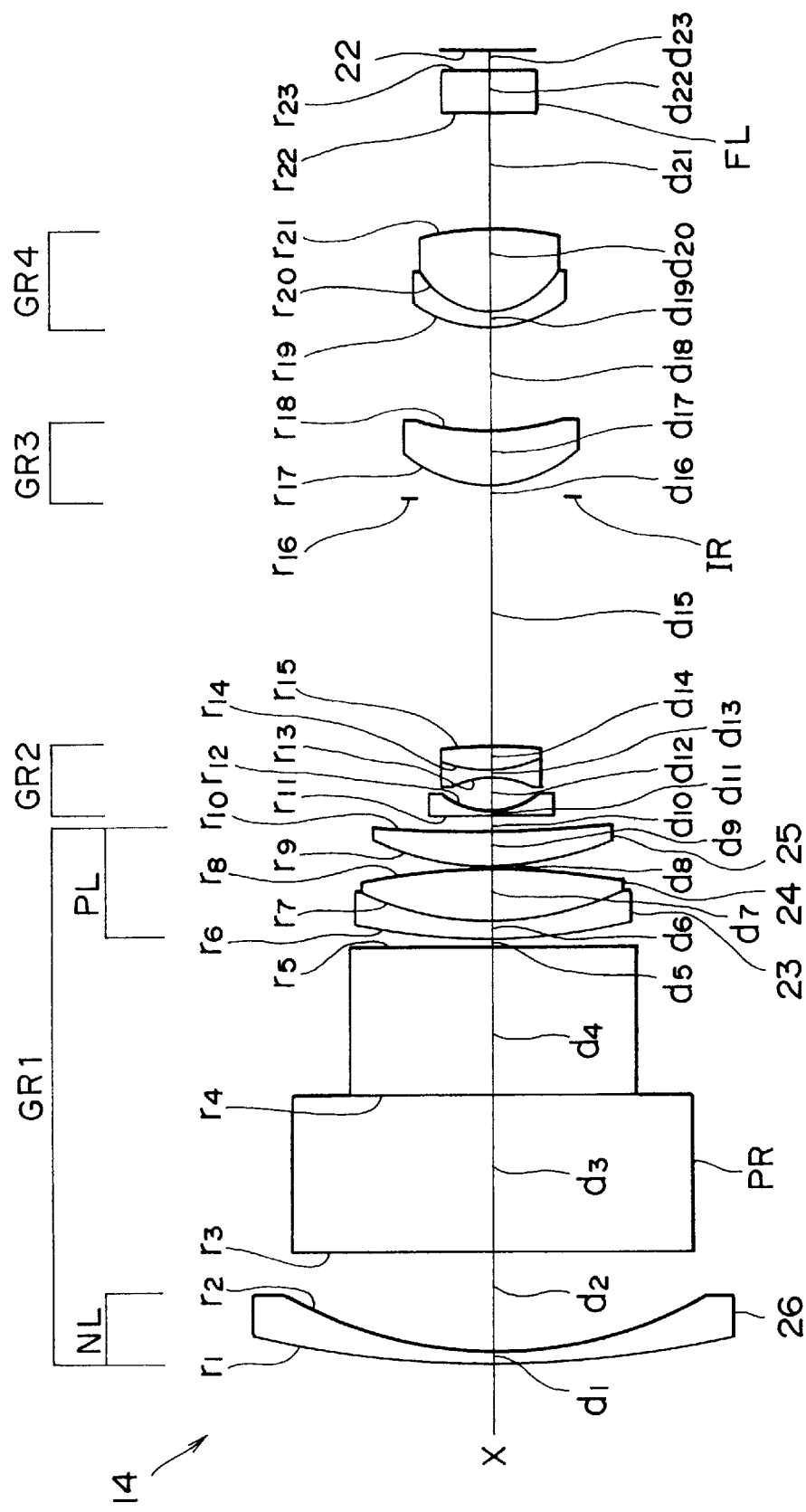
FIG. 2A is a schematic diagram of a first embodiment of the image pickup lens system according to the present invention in correspondence with FIGS. 2B, 2C, 2D, 3A, 3B and 3C.

A perspective view of a compact, lightweight integrated video camera and recording/reproducing apparatus (hereinafter referred to as video camera) comprising an image pickup lens system is shown in FIGS. 1A and 1B. In particular, FIG. 1A shows video camera 10 having main body 12 which includes three major portions: viewfinder portion 15, recording and reproducing portion 13 and imaging portion 14, also referred to as the image pickup lens system. Also shown in FIG. 1A is microphone 17 positioned in the front part of the camera, battery storage portion 16 in the rear part of the camera and grip 18 for holding the video camera. As shown in FIG. 1B, a tape deck cover swings outward, in the direction indicated by P, such that a recording medium, i.e., cassette, can be inserted into the video camera for recording and reproduction.

Initially, common features of various configurations of the image pickup lens system according to the present invention will be described hereinafter with reference to the illustrated first, second and third embodiments 14, 14A and 14B of FIGS. 2A, 4A and 6A, respectively. In these embodiments, the image pickup lens in the video camera is illustratively represented by a zoom lens.

Figure 4A:
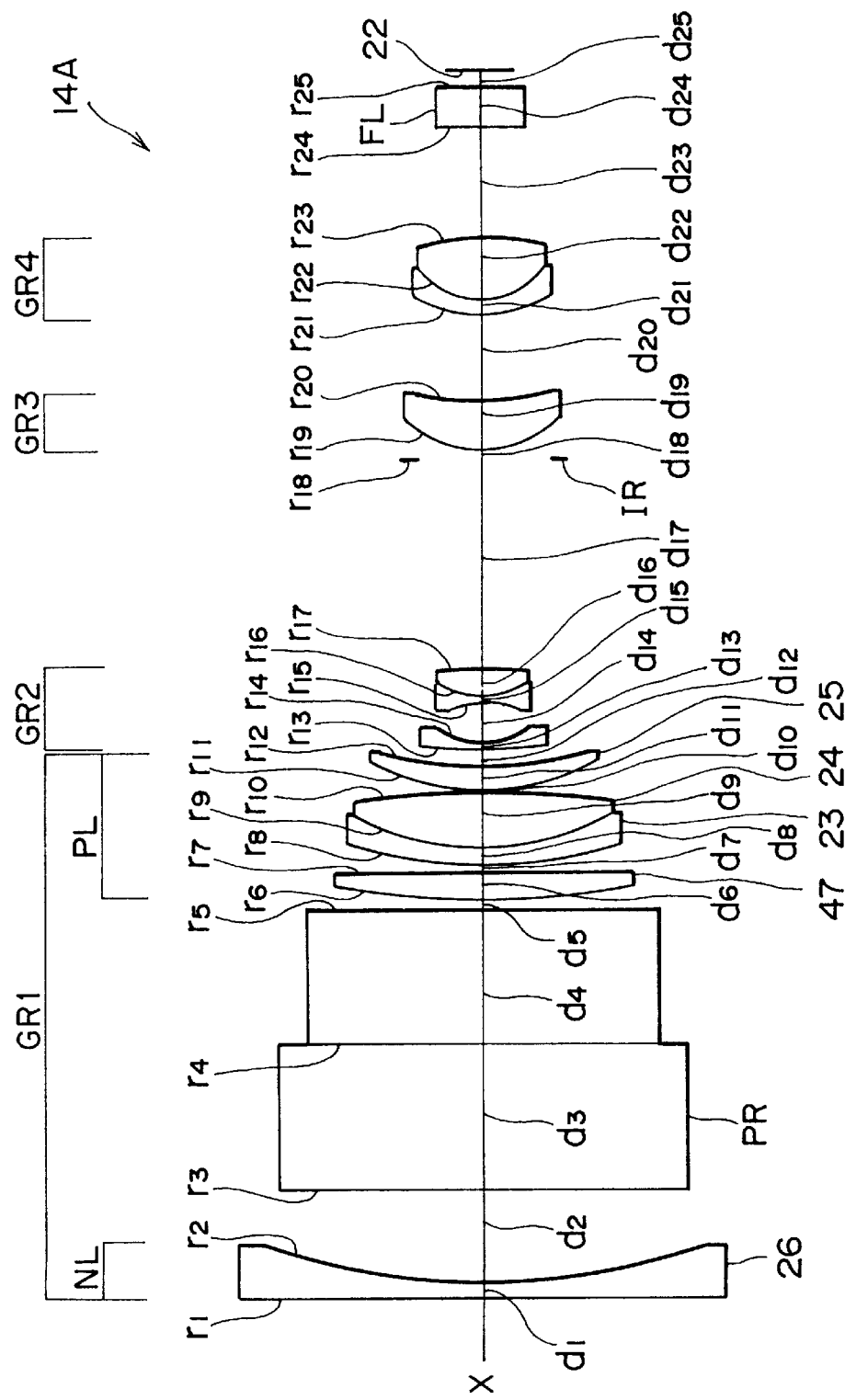
FIG. 4A is a schematic diagram of a second embodiment of the image pickup lens system according to the present invention in correspondence with FIGS. 4B, 4C, 4D, 5A, 5B and 5C.
Figure 6A:
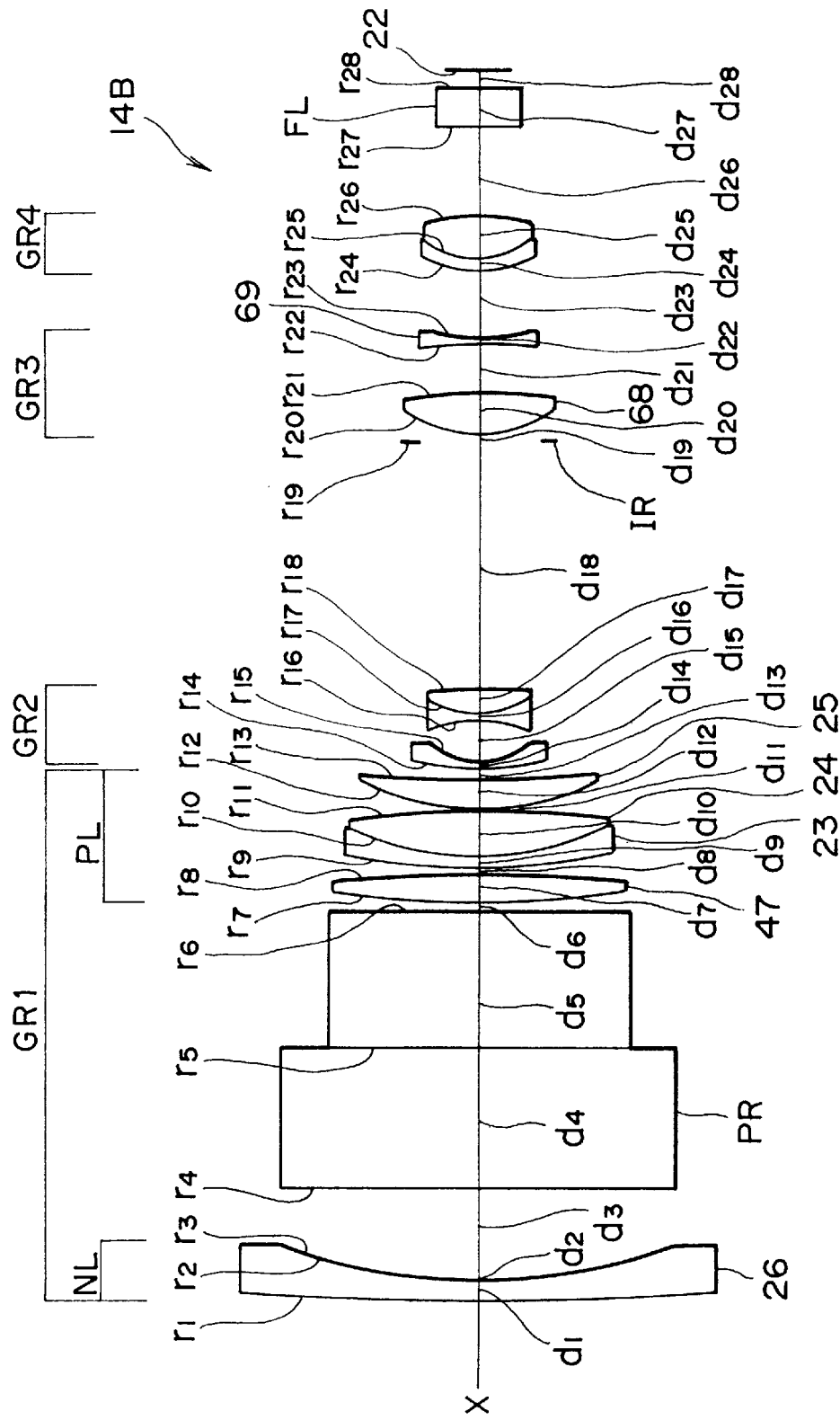
FIG. 6A is a schematic diagram of a third embodiment of the image pickup lens system according to the present invention in correspondence with FIGS. 6B, 6C, 6D, 7A, 7B and 7C.

As shown in FIGS. 2A, 4A and 6A, each of the zoom lenses 14, 14A and 14B includes a four group structure: the first lens group GR1 has positive refracting power, the second lens group GR2 has negative refracting power, the third lens group GR3 has positive refracting power and the fourth lens group GR4 has also positive refracting power (positive, negative, positive, positive groups.

Between a wide angle end and a telephoto end, a zooming operation is performed by moving at least the second lens group GR2 from the object side to the image side in the lens barrel (not shown). In addition, at least the fourth lens group GR4 can be moved to obtain a proper focus on image surface 22. That is, the fourth group GR4 compensates for the movement of the second group GR2 as a result of the zooming operation.

Further shown in FIGS. 2A, 4A and 6A is glass block FL functioning as an optical low-pass filter, which is positioned between the fourth lens group GR4 and the image side. Diaphragm IR is arranged between the second lens group GR2 and the third lens group GR3.

The first lens group GR1 functioning as the wide angle converter is formed of a negative lens group NL and a positive lens group PL. The positive lens group PL includes at least negative lens 23, positive lens 24 and positive lens 25, as shown in FIGS. 2A, 4A and 6A.

Furthermore, if the space between the negative lens group NL and the positive lens group PL is designated as "D1A", and "D1" is the distance from the surface closest to the object side of the first lens group GR1 to the surface thereof closest to image surface 22, the group GR1 may be arranged such that: $1.2 < D1/D1A < 1.7$ (hereinafter referred to as conditional expression (1)). By arranging the negative lens group NL on the object side of the first lens group GR1, this conditional expression (1) makes it possible to obtain the wide angle field of view while keeping the front lens diameter small.

In satisfying the conditional expression (1), it is also possible to secure a space within the first group GR1 for arranging an appropriate reflecting member, such as prism PR or mirror MR for example, between the negative lens group NL and the positive lens group PL. Such an arrangement, as fully illustrated in subsequent embodiments of the present invention, may provide for the folding of optical axis X. This results in a combination of the wide angle field of view and a compact design of the imaging portion of the video camera.

If the value of D1/D1A becomes smaller than 1.2 in the conditional expression (1), the space between the negative lens group NL and the positive lens group PL becomes too wide, thereby diminishing compactness of the design. In addition, in this case the front lens diameter becomes too large and is no longer practical in a compact video camera. Conversely, when the value of D1/D1A exceeds 1.7, the space between the negative lens group NL and the positive lens group PL becomes too narrow. This, in turn, prevents insertion of the reflecting member for folding optical axis X. That is, the space for inserting the prism PR or mirror MR disappears.

To maintain optimum optical performance, the negative lens group NL of the first lens group GR1 is composed of single element, i.e., negative lens 26, in all three embodiments. In the second and third embodiments of the present invention as shown in FIGS. 4A and 6A, respectively, the positive lens group PL of the first lens group GR1 is composed of four elements instead of three, i.e., positive lens 47, negative lens 23, and positive lenses 24, 25 arranged consecutively from the object side. In these two embodiments, an afocal unit is formed for correcting vibrations or shaking of a camera during the shooting of a video. The afocal unit is comprised of negative lens 26 of the first lens group GR1 and of positive lens 47 which follows negative lens 26.

With respect to the first embodiment of FIG. 2A, since the negative lens group NL and the positive lens group PL are spaced apart from each other for positioning the prism PR therebetween, a large spherical aberration is likely to be generated in the positive lens group PL. Therefore, to reduce this spherical aberration, positive lens 47 may be added on the object side of the lens group PL to the three-piece structure of negative lens 23 and positive lenses 24, 25 to obtain a positive lens group PL of the four-piece structure. Hence, by forming the afocal unit with the negative lens group NL (negative lens 26) and the additional positive lens 47, it becomes possible to assemble the folding portion of the optical axis X, i.e., the portion on the object side of positive lens 47, independently of other lens groups in the image pickup lens system of the camera. This becomes a significant advantage in mass production since the tolerances for each lens group need not be very strict.

Although the optical axis X may be folded in each of the wide-angle zoom lenses 14, 14A and 14B of FIGS. 2A, 4A and 6A, respectively, the combined total length of the image pickup lens system becomes longer by the additional space for the prism PR or mirror MR required for folding the optical axis X. To obtain compactness of the video camera, it, therefore, becomes necessary to reduce the total length of the image pickup lens system.

Thus, in order to shorten the total length of the system, it is possible to decrease either the movement of the second lens group GR2 or the distance from the third lens group GR3 to image surface 22. If the movement of the second lens group GR2 is reduced, the magnification power of the second lens group GR2 must be correspondingly increased with the attendant deterioration of the optical performance in the system. Consequently, the second option is more advantageous.

Hence, in the third embodiment of the present invention as illustrated in FIG. 6A, the distance from the third lens group GR3 to image surface 22 is shortened. This is accomplished by forming the zoom lens in the lens group GR3 with a two-piece structure of positive lens 68 and negative lens 69 arranged consecutively from the object side to the image side. Such arrangement of the third lens group GR3 provides a telephoto lens.

With reference to FIG. 6A, the third lens group GR3 is structured so that if "R31" is the radius of curvature of positive lens 68 on the object side, and "R32" is the radius of curvature of positive lens 68 on the image side, then the following expression is obtained: |R31/R32|<0.4 (hereinafter referred to as conditional expression (2)). Furthermore, if "R33" is the radius of curvature of negative lens 69 on the object side and "R34" is the radius of curvature of negative lens 69 on the image side, the following expression may be obtained: −0.5<R34/R33<0.2 (hereinafter referred to as conditional expression (3)). In addition, if "ΣD3" is the distance from the surface on the object side of positive lens 68 to the surface on the image side of negative lens 69, and "fW" is the focal length at the wide-angle end of the image pickup lens system, then the following expression is obtained: ED3/fW>1.2 (hereinafter referred to as conditional expression (4)). Finally, if "ν3P" is the Abbe number of positive lens 68 and "ν3N" is the Abbe number of negative lens 69, then the following expression is obtained: ν3P−ν3N>10 (hereinafter referred to as conditional expression (5)).

The above conditional expressions (2) through (5) will be described next.

If the value of |R31/R32| becomes larger than 0.4 in the conditional expression (2), the focal point of positive lens 68 is arranged on the image side. In addition, the spherical aberration on the image side of positive lens 68 becomes larger.

If the value of R34/R33 becomes −0.5 or less in the conditional expression (3), the magnification power on the object side of negative lens 69 becomes too large, the negative spherical aberration and coma aberration become larger, and operational and assembly precision, i.e., tolerances, of positive lens 68 and negative lens 69 becomes stricter. Furthermore in this case, since the power on the object side of negative lens 69, i.e., the power of the surface close to positive lens 68, becomes larger, it is nearly impossible to form an effective telephoto lens.

If the value of R34/R33 is larger than 0.2, the surface on the object side of negative lens 69 becomes convex with a small curvature radius. Therefore, the spherical aberration and coma aberration are impossible to correct using negative lens 69, thereby diminishing the optical performance of the system.

Next, if the value of ΣD3/fW is smaller than 1.2 in the conditional expression (4), it becomes difficult to arrange the principal point position of the third lens group GR3 on the object side. Hence, it is difficult to shorten the total length of the image pickup lens system.

Lastly, with respect to the conditional expression (5), it confirms that the correction of the chromatic aberration within the third lens group GR3 is made properly. Namely, it is possible to lower the degree of correction of chromatic aberration of the third lens group GR3 by setting the Abbe number of positive lens 68 and negative lens 69 such that the conditional expression (5) is satisfied. As a result, it becomes easier to correct the chromatic aberration of the complete lens system.

The first through third embodiments of the present invention will now be described in detail. In the description below and tables of FIGS. 2B, 2C, 2D, 4B, 4C, 4D, 6B, 6C, 6D, "r" represents radius of a surface curvature, "d" a space between two adjacent surfaces, "N" a refractive index at the spectral d-line (wavelength=587.6 nm), "ν" the Abbe number, "f" a focal length of the complete lens system, "FNO" an F-number of the complete lens system, and "ω" a half angle of the field of view.

Then, "$r_i$" shows the radius of the ith surface (i=1, 2, 3, ..., 28) counting from the object side to the image side, "$d_i$" shows the space between the ith surface and the (i+1)th surface, and "$N_i$" and "ν" show the refractive index and the Abbe number, respectively, with respect to the spectral d-line of a medium between the ith surface and the (i+1)th surface.

It is worth noting that the lenses in these embodiments may include aspherical surfaces. In such case, it is assumed that the aspherical surface configuration is defined by the following expression:

$$Xa = c \cdot y^2 / [1 + \sqrt{(1 - c^2 \cdot y^2)}] + \Sigma(A_{2i} \cdot y^{2i})$$

Here, "Xa" is a coordinate in the X-direction of the optical axis of the aspherical surface, "c" is a paraxial curvature (1/r), "A" is the 2i-th aspherical coefficient, and "y" is the distance from the optical axis X.

FIGS. 2A, 2B, 2C, 2D, 3A, 3B and 3C pertain to the first embodiment of the present invention. Zoom lens 14 in the first embodiment comprises a 4-group, 10-piece structure of the first through the fourth lens groups GR1, GR2, GR3 and GR4 located consecutively from the object side, as shown in FIG. 2A. FIG. 2B shows dimensional values for the lenses of the zoom lens 14, where the 18th and the 21st surfaces are aspherical. FIG. 2C shows the 4th, 6th and the 8th-order aspherical coefficients A4, A6 and A8, respectively, of these aspherical surfaces, i.e., the 18th and 21st. In all figures, "e" designates an exponential expression with base 10.

FIG. 2D shows values for $d_{10}$ (the space between the first lens group GR1 and the second lens group GR2), $d_{15}$ (the space between the second lens group GR2 and the diaphragm IR), $d_{18}$ (the space between the third lens group GR3 and the fourth lens group GR4) and $d_{21}$ (the space between the fourth lens group GR4 and the glass block FL) when f (the focal length of the whole system) changes from 1.000 to 2.4903 and then to 9.5727 according to the operation of zoom lens 14.

FIGS. 3A, 3B and 3C show a spherical aberration diagram, an astigmatism diagram and a distortion aberration diagram, respectively, in the wide-angle, normal and telephoto states of zoom lens 14. In the spherical aberration diagram of these figures as well as other spherical aberration diagrams hereinbelow, a solid line shows values along the spectral d-line, and a dashed line shows values along the spectral g-line (wavelength=435.8 nm). In the astigmatism diagram of these figures as well as other astigmatism diagrams hereinbelow, the solid line shows values on a sagittal image surface, and the dashed line shows values on a meridional image surface.

FIGS. 4A, 4B, 4C, 4D, 5A, 5B and 5C pertain to the second embodiment of the present invention. Zoom lens 14A in the second embodiment comprises a 4-group, 11-piece structure of the first through the fourth lens groups GR1, GR2, GR3 and GR4 located consecutively from the object side, as shown in FIG. 4A. FIG. 4B shows dimensional values for the lenses of the zoom lens 14A, where the 20th and the 23rd surfaces are aspherical. FIG. 4C shows the 4th, 6th and the 8th-order aspherical coefficients A4, A6 and A8, respectively, of these aspherical surfaces, i.e., the 20th and 23rd.

FIG. 4D shows respective values of $d_{12}$ (the space between the first lens group GR1 and the second lens group GR2), $d_{17}$ (the space between the second lens group GR2 and the diaphragm IR), $d_{20}$ (the space between the third lens group GR3 and the fourth lens group GR4) and $d_{23}$ (the space between the fourth lens group GR4 and the glass block FL) when f (the focal length of the whole system) changes from 1.000 to 2.4615 and then to 9.5692 according to the operation of zoom lens 14A.

FIG. 5A, 5B and 5C show the spherical aberration diagram, the astigmatism diagram and the distortion aberration diagram, respectively, in the wide-angle, normal and telephoto states of zoom lens 14A.

FIGS. 6A, 6B, 6C, 6D, 7A, 7B and 7C pertain to the third embodiment of the present invention. Zoom lens 14B in the third embodiment comprises a 4-group, 12-piece structure of the first through the fourth lens groups GR1, GR2, GR3 and GR4 located consecutively from the object side, as shown in FIG. 6A. FIG. 6B shows dimensional values for the lenses of the zoom lens 14B, where the 3rd, 21st and the 26th surfaces are aspherical. FIG. 6C shows the 4th, 6th and the 8th-order aspherical coefficients A4, A6 and A8, respectively, of these aspherical surfaces, i.e., the 3rd, 21st and 26th.

FIG. 6D shows respective values of $d_{13}$ (the space between the first lens group GR1 and the second lens group GR2), $d_{18}$ (the space between the second lens group GR2 and the diaphragm IR), $d_{23}$ (the space between the third lens group GR3 and the fourth lens group GR4) and $d_{26}$ (the space between the fourth lens group GR4 and the glass block FL) when f (the focal length of the whole system) varies between 1.000, 2.4499 and 9.5815 according to the operation of zoom lens 14B.

FIG. 7A, 7B and 7C show the spherical aberration diagram, the astigmatism diagram and the distortion aberration diagram, respectively, in the wide-angle, normal and telephoto states of zoom lens 14B.

In zoom lens 14B, negative lens 26 of the first lens group GR1 has a composite aspheric surface on the image side. Such surface corrects the distortion aberration and is obtained by having a resin layer glued to a glass spherical surface.

In summary, respective values of f, FNO and 2ω in the first through third embodiments are shown in FIG. 8A, and respective values in the conditional expressions (1) through (5) are shown in FIG. 8B. It is understood that the conditional expressions (2) to (5) pertain only to the third embodiment as described above.

It is apparent from the above description that a compact video camera can be achieved with the image pickup lens system of the present invention. The inventive system provides, among other things, a wide angle field of view combined with a zoom lens. Furthermore, the so-called folding of the optical axis offered by the inventive image pickup lens system contributes to the overall compactness and flexible design of the video camera.

In this respect, the fourth, fifth and sixth embodiments of the present invention will now be described in detail. These embodiments pertain to the optical axis which is folded between the object side and the image side, as mentioned above. It is understood that the image pickup lens system can be applied to the zoom lens, as well as a regular lens, used in the video camera.

Figure 9A:
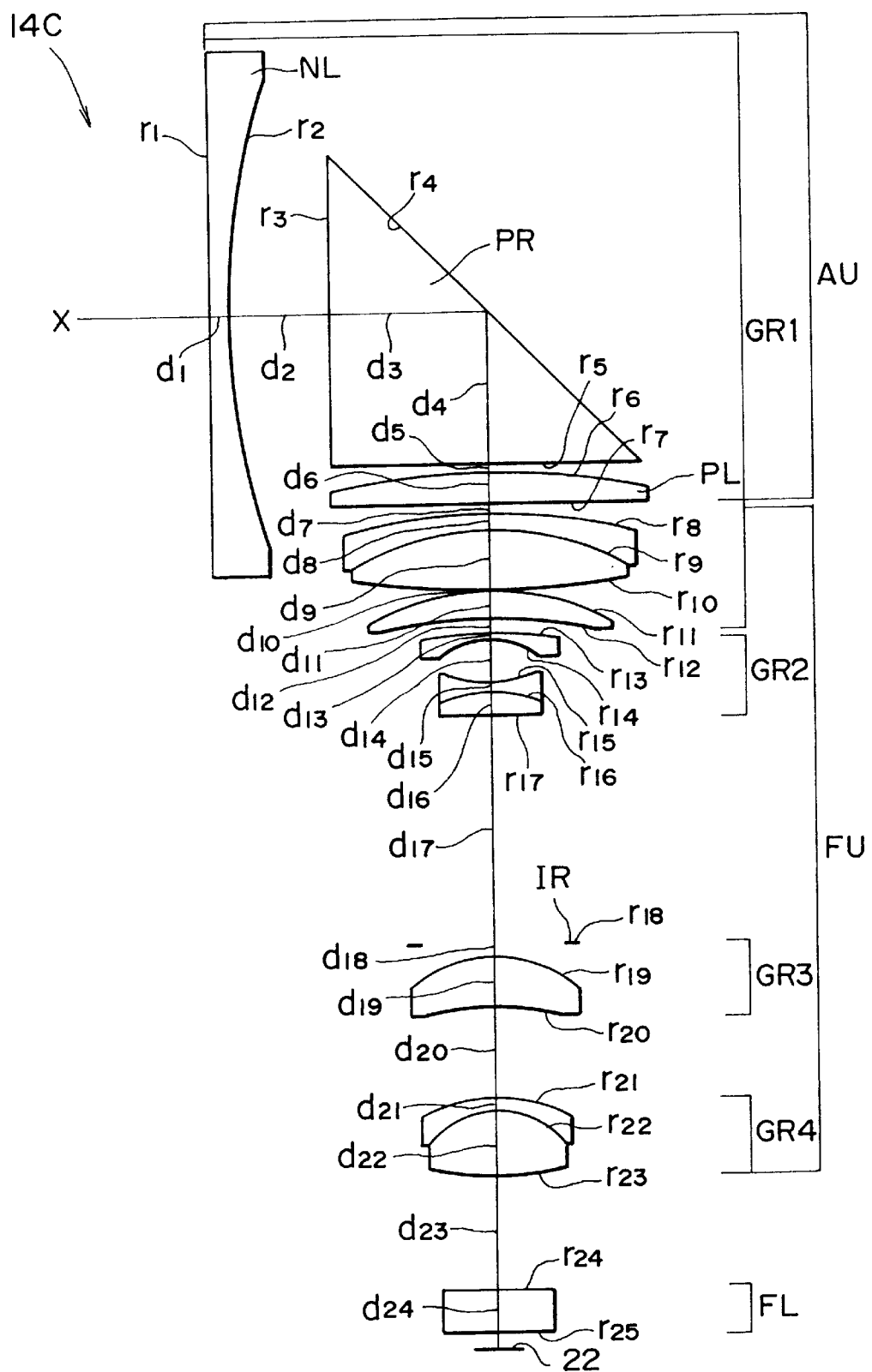
FIG. 9A is a schematic diagram of a fourth embodiment of the image pickup lens system according to the present invention in correspondence with FIGS. 9B, 9C, 9D, 10A, 10B and 10C.
Figure 11A:
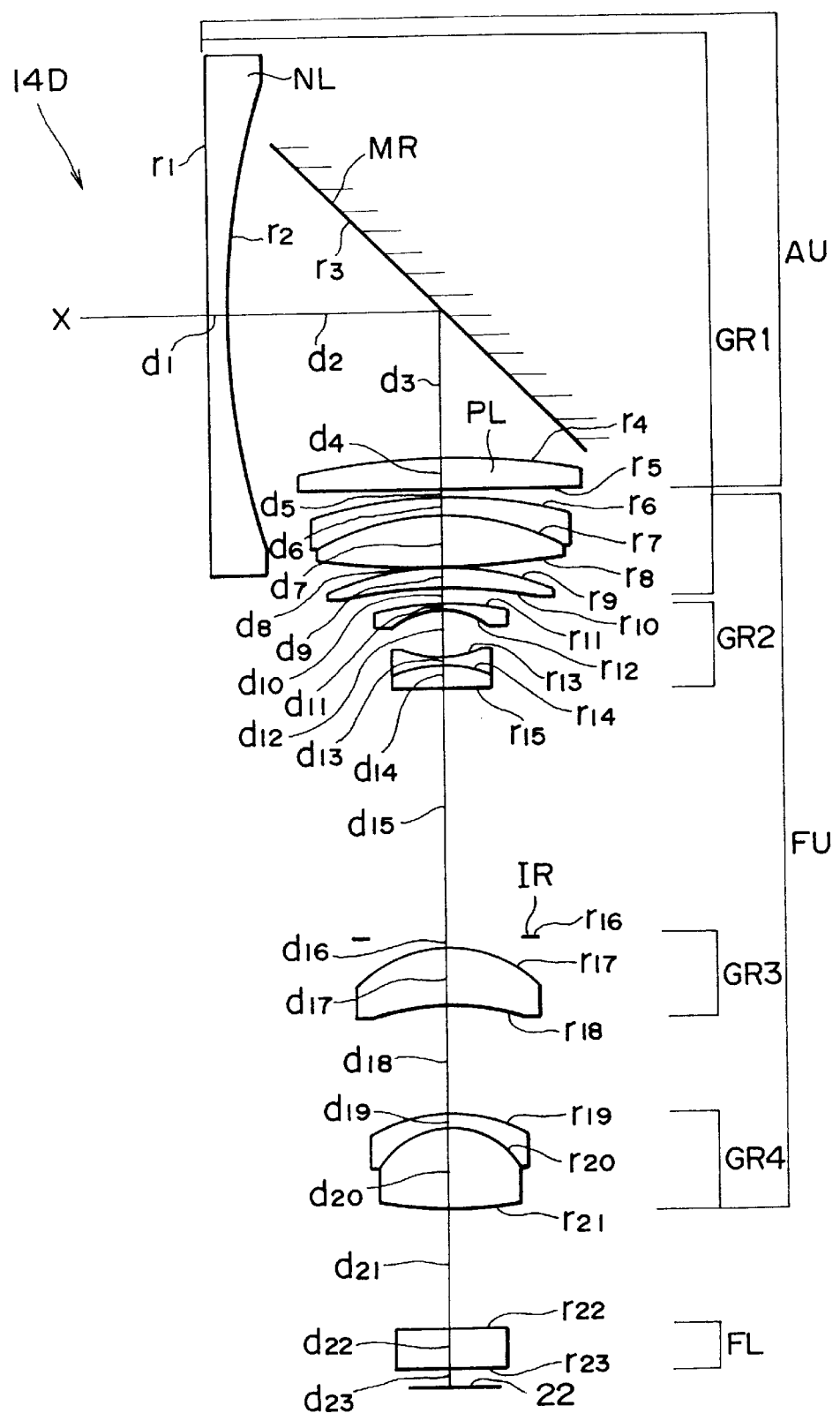
FIG. 11A is a schematic diagram of a fifth embodiment of the image pickup lens system according to the present invention in correspondence with FIGS. 11B, 11C, 11D, 12A, 12B and 12C.

First, a basic structure common to the fourth, fifth and sixth embodiments will be described with reference to FIGS. 9A, 11A and 13A. In each image pickup lens system 14C, 14D and 14E of the respective embodiments, an afocal unit AU comprises negative lens group NL with negative refracting power and positive lens group PL with positive refracting power. Reflecting member PR or MR is arranged between the negative lens group NL and positive lens group PL, as shown in FIGS. 9A, 11A and 13A.

The optical axis X of the image pickup lens system 14C, 14D or 14E is folded at approximately 90 degrees at the surface of the reflecting member PR or MR, extending toward the image side. The exemplary fifth embodiment of FIG. 11A shows the mirror MR used as the reflecting member, while the fourth and sixth embodiments of FIGS. 9A and 13A, respectively, use the prism PR.

It is also understood from the above description of the first three embodiments that the afocal unit AU can also operate as the wide-angle converter.

Similar to the first three embodiments, the afocal unit AU and imaging lens portion FU (focal unit) are composed of the four lens groups GR1, GR2, GR3 and GR4 having positive, negative, positive and positive refracting power, respectfully, located consecutively from the object side. The first lens group GR1 and the third lens group GR3 are fixed with respect to image surface 22. When zooming from the wide-angle end to the telephoto end and vice versa, the second lens group GR2 moves from the object side to the image side within a lens mirror cylinder (not shown), and vice versa. Furthermore, the fourth lens group GR4 can be moved to obtain a proper focus on image surface 22 attendant upon the movement of the second lens group GR2.

Again similar to the first three embodiments, a glass block FL functions as an optical low-pass filter, which is positioned between the fourth lens group GR4 and image surface 22. Diaphragm IR is arranged between the second lens group GR2 and the third lens group GR3.

Some lens surfaces in the fourth, fifth and sixth embodiments are aspherical. In this respect, it is assumed that the aspherical surface configuration is defined by the aforementioned expression:

$$Xa = c \cdot y^2 / [1 + \sqrt{(1 - c^2 \cdot y^2)}] + \Sigma(A_{2i} y^{2i}).$$

As before, "Xa" is the coordinate in the X-direction of the optical axis, "c" is the paraxial curvature (1/r), "A" is the 2i-th aspherical coefficient, and "y" is the distance from the optical axis X.

FIGS. 9A, 9B, 9C, 9D, 10A, 10B and 10C pertain to the fourth embodiment of the image pickup lens system according to the present invention. As shown in FIG. 9A, the image pickup lens system 14C comprises the afocal unit AU and the imaging portion FU. The afocal unit AU is a two-piece lens structure which comprises negative lens group NL and positive lens group PL, located consecutively from the object side, and prism PR which is the reflecting member arranged between the negative lens group NL and positive lens group PL. The imaging portion FU following the afocal unit AU comprises a nine-piece lens structure, which together with the afocal unit AU is composed of the first through the fourth lens groups GR1, GR2, GR3 and GR4.

FIG. 9B shows dimensional values for the lenses in the image pickup lens system 14C in the fourth embodiment. According to this embodiment, the 20th and the 23rd surfaces are aspherical. FIG. 9C shows the fourth, the sixth and the eighth aspherical coefficients A4, A6 and A8 of these surfaces. FIG. 9D shows the respective values of d12, d17, d20 and d23 when f varies between 1.000, 2.4615 and 9.5692 with the zooming operation of the image pickup lens system 14C proceeding from the wide angle end to the telephoto end.

FIGS. 10A, 10B and 10C show the spherical aberration diagram, the astigmatism diagram and the distortion aberration diagram, respectively, in the wide-angle, normal and telephoto states of zoom lens 14C.

FIGS. 11A, 11B, 11C, 11D, 12A, 12B and 12C pertain to the fifth embodiment of the present invention. As shown in FIG. 11A, image pickup lens system 14D comprises the afocal unit AU and the imaging portion FU. The afocal unit AU is a two-group, two-piece lens structure which is composed of a negative lens group NL and a positive lens group PL located consecutively from the object side, and a mirror MR which is the reflecting member arranged between the negative lens group NL and positive lens group PL. The imaging portion FU following the afocal unit AU comprise a four-group, nine-piece lens structure. The afocal unit AU and imaging portion FU are composed of the first through the fourth lens groups GR1, GR2, GR3 and GR4.

FIG. 11B shows dimensional values for the lenses in the image pickup lens system 14D in the fifth embodiment. According to this embodiment, the 18th and the 21st surfaces are aspherical. FIG. 11C shows the fourth, the sixth and the eighth aspherical coefficients A4, A6 and A8 of these surfaces. FIG. 11D shows the respective values of $d_{10}$, $d_{15}$, $d_{18}$ and $d_{21}$ when f varies between 1.000, 2.4863 and 9.5741 with the zooming operation of the image pickup lens system 14D proceeding from the wide angle end to the telephoto end.

FIG. 12A, 12B and 12C show the spherical aberration diagram, the astigmatism diagram and a distortion aberration diagram, respectively, in the wide-angle, normal and telephoto states of zoom lens 14C.

FIGS. 13A, 13B, 13C, 13D, 14A, 14B and 14C pertain to the sixth embodiment of the present invention. As shown in FIG. 13A, the image pickup lens system 14E comprises the afocal unit AU and the imaging portion FU. The afocal unit AU is a two-piece lens structure which is composed of a negative lens group NL and a positive lens group PL, consecutively located from the object side. A prism PR is positioned between the negative lens group NL and positive lens group PL. The imaging lens portion FU following the afocal unit AU comprises a ten-piece lens structure, which together with the afocal unit AU, is composed of the first through the fourth lens groups GR1, GR2, GR3 and GR4.

FIG. 13B shows dimensional values for the lenses in the image pickup lens system 14E in the sixth embodiment. According to this embodiment, the 3rd, 21st and the 26th surfaces are aspherical. FIG. 13C shows the fourth, the sixth and the eighth aspherical coefficients A4, A6 and A8 of these aspherical surfaces. FIG. 14D shows the respective values of d13, d18, d23 and d26 when f varies between 1.000, 2.4499 and 9.5812 with the zooming operation of the image pickup lens system 14E proceeding from the wide angle end to the telephoto end.

FIGS. 14A, 14B and 14C show the spherical aberration diagram, the astigmatism diagram and the distortion aberration diagram, respectively, in the wide-angle, normal and telephoto states of zoom lens 14E.

In zoom lens 14E, the negative lens NL which is closest to the object side has a composite aspheric surface on the image side. Such surface corrects the distortion aberration and is obtained by having a resin layer glued to a glass spherical surface.

As shown in the respective embodiments and described above, a prism or mirror is provided as the reflecting member. When used as the reflecting member, the prism preferably should be made of a glass material with a relatively high refractive index. Since the overall optical path length may be shortened by using such a glass material in the prism, it is possible to decrease the front lens diameter. Furthermore, since total reflection can be utilized, a reflecting film is not required in the system, while the reflectivity can be even increased compared with constructors that use a reflecting film. Hence, a cost-saving advantage is achieved.

In one aspect of the present invention, when the afocal unit AU functions as the wide-angle converter, large negative distortion aberration may be generated by the negative lens group NL. In order to correct such a problem, it is sufficient to use an aspherical surface at least on one surface of the lens which is closest to the object side. In this case, the aspherical surface may be any of a glass aspherical surface, a plastic aspherical surface or a composite aspherical surface obtained by having a resin layer glued to a glass spherical lens.

In another aspect of the present invention, since each of the negative lens group NL and the positive lens group PL of the afocal unit AU is formed from a single lens, the film thickness of the respective lens groups NL and PL can be thin. Thus, miniaturization of the camera, in combination with low cost of the image pickup lens system, can be realized.

Furthermore, to reduce chromatic aberration generated in the afocal unit AU and the imaging portion FU, a conventional lens structure of the afocal unit AU may become quite complex, causing an increase in size and cost. In contrast, since chromatic aberration, which cannot be corrected fully in the afocal unit AU, is additionally corrected in the imaging portion FU according to the present invention, the above-mentioned possible disadvantages of increased cost and size are completely eliminated.

It is apparent from the above description that the image pickup lens system of the present invention comprises an afocal unit and an imaging portion, consecutively located from the object side, and a reflecting member positioned between the negative and positive lens groups that form the afocal unit, such that an optical axis from the object side and an optical axis at an image surface is folded by the reflecting member.

Thus, in the image pickup lens system of the present invention, the reflecting member is arranged in such a way that the position where the optical axis is folded is located closer to the object side. As a result, the tolerance becomes larger for placement accuracy during the assembly of the afocal unit and the imaging portion, reducing degradation in optical performance due to possible errors during production. Furthermore, it is easier to allocate the space closer to the object side for folding the optical axis. In addition, it becomes feasible to provide an image pickup lens system without constraints on the miniaturization and design of the video camera.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An integrated video camera and recording/reproducing apparatus, comprising:
    a main body including a viewfinder portion, a recording/reproducing portion, and an image pickup lens system having an object side, an image side and an optical axis, said image pickup lens system including a wide angle converter and a zoom lens, wherein said wide angle converter comprises at least a negative lens and a positive lens spaced apart from each other such that D1/D1A is greater than 1.2 and less than 1.7 where D1 is a distance between a lens surface of said negative lens closest to said object side and a lens surface of said positive lens closest to said image side, and D1A is a distance between said negative lens and said positive lens.

2. The apparatus according to claim 1, further comprising a reflecting member located between said negative and positive lens, wherein said optical axis is folded.

3. The apparatus according to claim 2, wherein said optical axis is folded at a position which is closer to said object side than said image side of said apparatus.

4. The apparatus according to claim 1, further comprising a battery storage compartment.

5. The apparatus according to claim 1, further comprising a tape deck cover opening outward and away from said apparatus for inserting a recording medium therein.

6. An image pickup lens system for a video camera, comprising:
a zoom lens located at an image side of said image pickup lens system, and
a wide angle converter located at an object side of said image pickup lens system and optically coupled to said zoom lens, said wide angle converter comprising a first lens group having at least a negative lens group and a positive lens group spaced apart from each other such that D1/D1A is greater than 1.2 and less than 1.7 where D1 is a distance between a lens surface of said first lens group closest to said object side and a lens surface of said first lens group closest to said image side, and D1A is a distance between said negative lens group and said positive lens group.

7. The apparatus according to claim 6, wherein said first lens group has positive refracting power.

8. The apparatus according to claim 7, further comprising a second lens group having negative refracting power, a third lens group and a fourth lens group each having positive refracting power, and wherein said first, second, third and fourth lens groups are arranged consecutively from said object side and are located along said optical axis.

9. The apparatus according to claim 8, wherein said second lens group is moveable between said first and third groups in response to a zooming operation between a wide angle end and a telephoto end of said image pickup lens system.

10. The apparatus according to claim 8, wherein said fourth group is moveable between said third lens group and said image side for focusing an image as a function of said zooming operation.

11. The apparatus according to claim 8, wherein said first, second, third and fourth lens groups include lenses with aspherical surfaces.

12. The apparatus according to claim 8, wherein said third lens group comprises a positive lens and a negative lens positioned consecutively from said object side, said third lens group being arranged such that $|R31/R32|$ is less than 0.4, R34/R33 is greater than $-0.5$ and less than 0.2, $\Sigma D3/fW$ is greater than 1.2 and $\nu 3P - \nu 3N > 10$, where R31 is a radius of curvature of said positive lens on said object side, R32 is a radius of curvature of said positive lens on said image side, R33 is a radius of curvature of said negative lens on said object side, R34 is a radius of curvature of said negative lens on said image side, $\Sigma D3$ is a distance from a surface of said object side of said positive lens to a surface of said image side of said negative lens, fW is a focal length at a wide-angle end of said image pickup lens system, $\nu 3P$ is the Abbe number of said positive lens, and $\nu 3N$ is the Abbe number of said negative lens.

13. The apparatus according to claim 6, wherein said negative lens group of said first lens group comprises a single negative lens, and wherein said positive lens group of said first lens group comprises at least a negative lens and two positive lenses positioned consecutively from said object side.

14. The apparatus according to claim 6, further comprising a reflecting member located between said negative and positive lens groups, said zoom lens and wide angle converter having a common optical axis which is folded.

15. The apparatus according to claim 14, wherein said common optical axis is folded at a position which is closer to said object side than said image side of said apparatus.

16. The apparatus according to claim 15, wherein said optical axis is folded at substantially 90 degrees by said reflective member.

17. The apparatus according to claim 14, wherein said reflecting member is selected from one of a prism and mirror.

18. The apparatus according to claim 6, wherein said negative lens group comprises a single negative lens, and wherein said positive lens group comprises a first positive lens, a negative lens, a second positive lens and a third positive lens positioned consecutively from said object side.

19. The apparatus according to claim 18, wherein said single negative lens and said first positive lens form an afocal unit in said image pickup lens system.

20. The apparatus according to claim 19, wherein chromatic aberration generated in said afocal unit is additionally corrected by said zoom lens.

* * * * *